(12) United States Patent
Matskewich et al.

(10) Patent No.: US 7,286,269 B2
(45) Date of Patent: Oct. 23, 2007

(54) USE OF AN INPUT BLACK AND WHITE BITMAP TO GENERATE EMBOLDENED ANTI-ALIASING BITMAP

(75) Inventors: Tanya Matskewich, Kirkland, WA (US); Mohammed Gabar El-Gammal, Woodinville, WA (US); David L. Kilgrow, Redmond, WA (US); Jian Wang, Bellevue, WA (US); Jiang Wu, San Jose, CA (US); Liyong Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 160 days.

(21) Appl. No.: 11/158,503

(22) Filed: Jun. 22, 2005

(65) Prior Publication Data

US 2006/0146370 A1    Jul. 6, 2006

Related U.S. Application Data

(60) Provisional application No. 60/640,868, filed on Dec. 30, 2004.

(51) Int. Cl.
*H04N 1/40* (2006.01)
(52) U.S. Cl. ..................................... 358/3.26; 382/266

(58) Field of Classification Search ........ 382/189–190, 382/260–269; 358/3.26, 1.9
See application file for complete search history.

(56) References Cited

U.S. PATENT DOCUMENTS

| 6,542,161 | B1 | 4/2003 | Koyama et al. | 345/589 |
|---|---|---|---|---|
| 6,782,142 | B2 * | 8/2004 | Loce et al. | 382/296 |
| 2004/0076343 | A1 | 4/2004 | Zhang et al. | 382/300 |
| 2006/0146054 | A1 | 7/2006 | Matskewich et al. | 345/472 |

OTHER PUBLICATIONS

U.S. Appl. No. 60/640,868, filed Dec. 30, 2004, Matskewich et al.

* cited by examiner

*Primary Examiner*—Thomas D. Lee
*Assistant Examiner*—Stephen Brinich
(74) *Attorney, Agent, or Firm*—Workman Nydegger

(57) ABSTRACT

A computer-implemented simulated emboldening mechanism for emboldening an input Black and White bitmap to generate an emboldened Anti-Aliasing bitmap. The simulated emboldening adjusts the intensity of the pixel in the direction of emboldening taking into account contextual information regarding surrounding pixels. Since the emboldening is not limited to a Black and White output bitmap, and since the emboldening takes such contextual information into account, legibility and readability of the resulting emboldened character is enhanced.

22 Claims, 16 Drawing Sheets
(10 of 16 Drawing Sheet(s) Filed in Color)

From Fig. 2A 

(AA: Overscaled To Simple Bitmap)
 [Step 1]
  ...
 [Step N_AA]
Input: overscaled bitmap
Output: simple AA bitmap Compute gray-scale values of the pixels: one value per pixel, based on the values in the overscaled bitmap. Those values will be later converted into the shades of gray by an application outside of the rasterizer.

Depending on the particular algorithm, the computation of the final gray levels can be logically subdivided into several steps ([Step 1]...[Step N_AA]). At every step some intermediate values can be assigned to every pixel, generating a sequence of intermediate simple bitmaps.

For example, the simplest algorithm can count the number of the subpixels with value 1 inside every pixel and assign gray-scale values from 0 to 16 (17 gray levels).

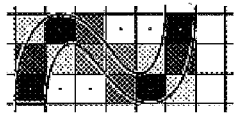

A simple AA bitmap derived from the overscaled bitmap. A single value from 0 to 16 corresponds to every pixel. For every pixel, the value equals to the number of "black" subpixels (i.e. subpixels with value 1).

Possible mapping of AA values to the shades of gray, done by an application *outside* of the rasterizer

*Fig. 2B*
*(Prior Art)*

(AA: Bitmap Simple Regular to Bitmap Bold Regular)
Input: simple AA bitmap
Output: simple AA bitmap Input

| 5 | 16 | 10 | 0 | 0 | 16 |
|---|----|----|---|---|----|
| 13 | 5 | 7 | 7 | 5 | 13 |
| 16 | 0 | 0 | 10 | 16 | 5 |

In this example the simple AA bitmap is obtained by overscaling an outline (with overscale factors (4,4)) and counting turned on subpixels for every pixel; so that every pixel has a value between 0 and 16.
However, the emboldening can be applied independently of the source of the input; i.e. it will work equally fine for the input originated from an embedded bitmap with AA values ranging from 0 to 16.

Output

| 5 | 16 | 16 | 10 | 0 | 16 | 16 |
|---|----|----|----|---|----|----|
| 13 | 16 | 12 | 14 | 12 | 16 | 13 |
| 16 | 16 | 0 | 10 | 16 | 15 | 5 |

The output has exactly the same format as the input: a simple AA bitmap with values ranging from 0 to 16. Two examples of computations of the output values are shown below.
  (1) Third pixel in the second row (the left highlighted pixel) has value 7 in the input bitmap and its immediate left neighbor has value 5. After emboldening the pixel is assigned value 12=7+5.
  (2) Second pixel in the second row has value 5 in the input bitmap and its immediate left neighbor has value 13. Since 5+13=18 is greater than the maximal value (16) allowed in the chosen format, value 16 is assigned to the pixel.

Result of a possible mapping of the output image to the shades of gray, performed by software external to the rasterizer.

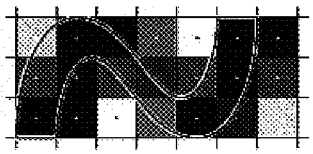

*Fig. 4B*
*(Prior Art)*

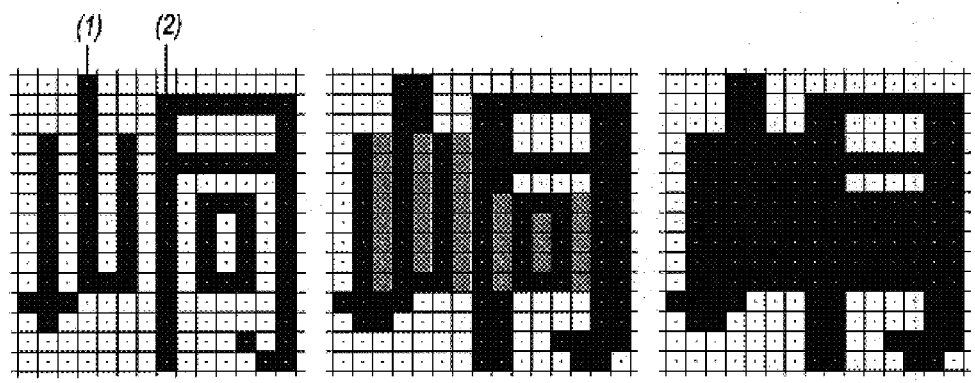
Fig. 9A  Fig. 9B  Fig. 9C
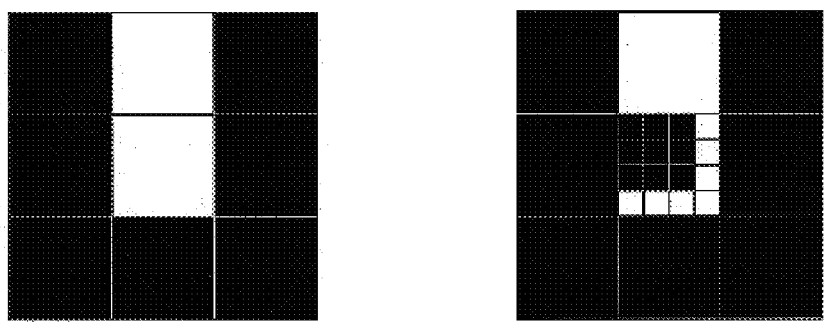
Fig. 10
Fig. 11A  Fig. 11B

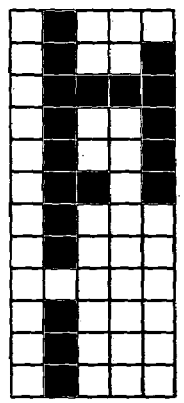 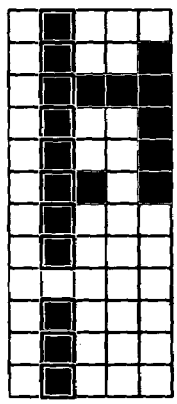 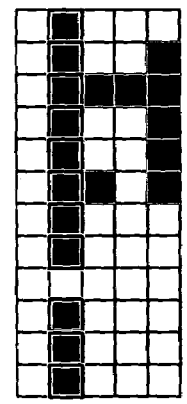 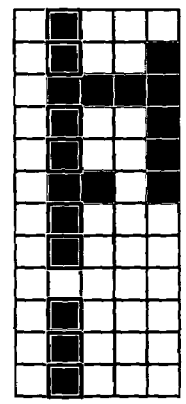 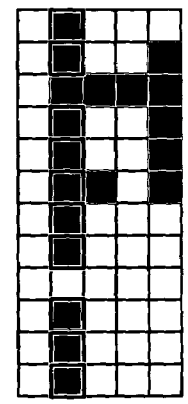
Fig. 14A     Fig. 14B     Fig. 14C     Fig. 14D     Fig. 14E
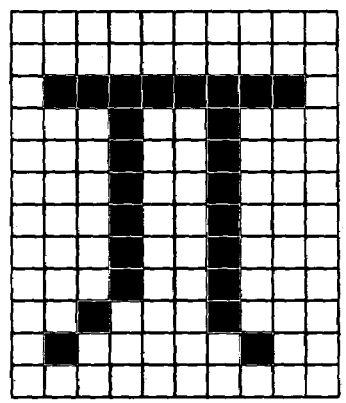     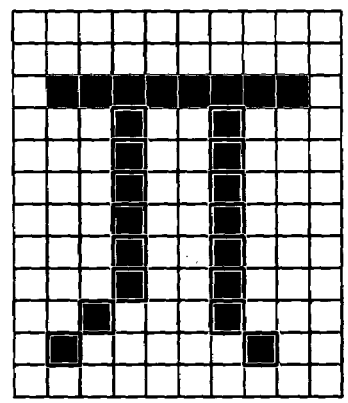
Fig. 15A           Fig. 15B
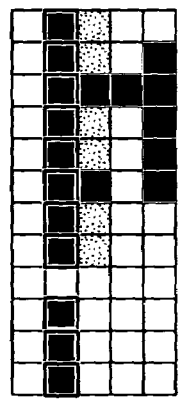
Fig. 16

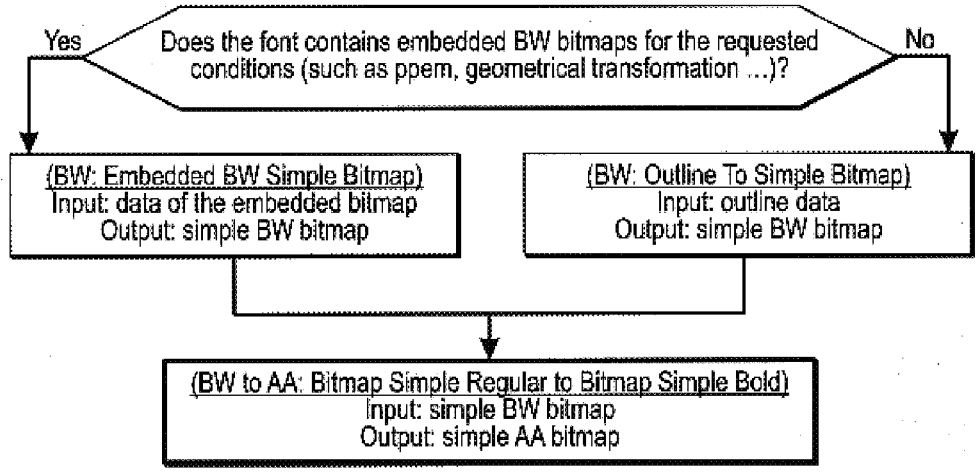
*Fig. 18*
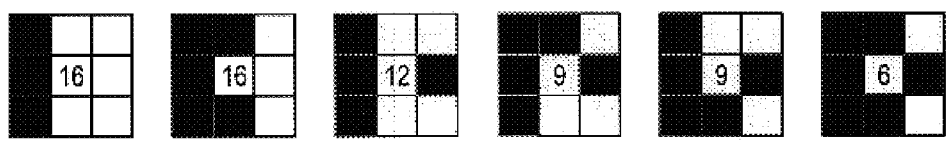
*Fig. 19*
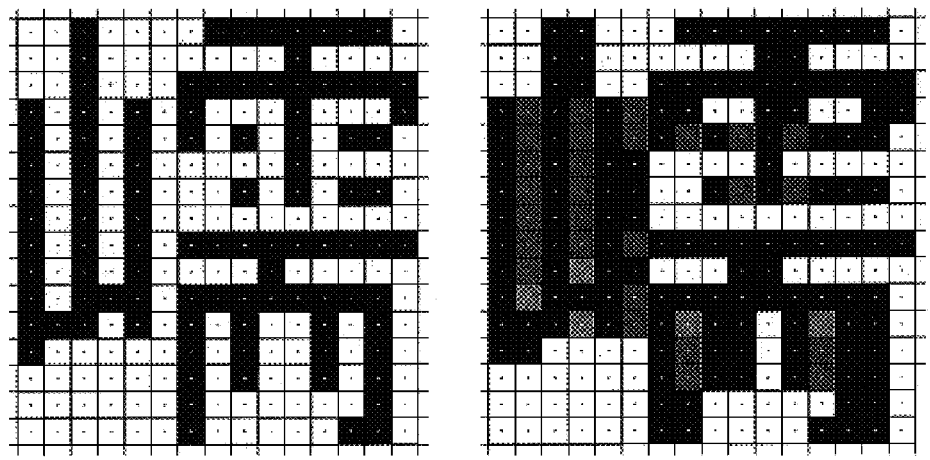
*Fig. 20A*        *Fig. 20B*

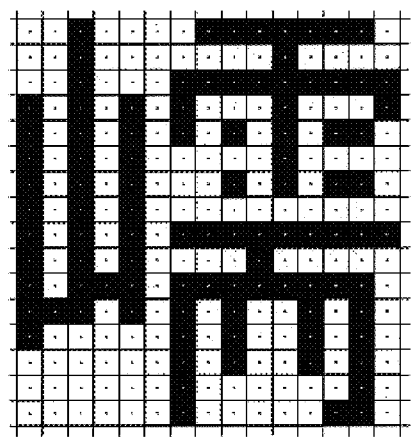 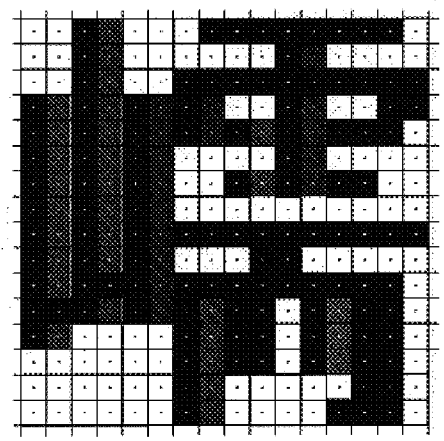
Fig. 21A        Fig. 21B
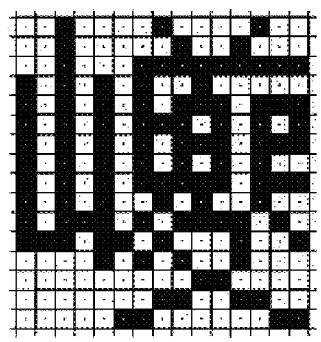 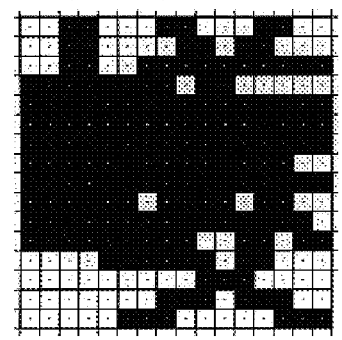 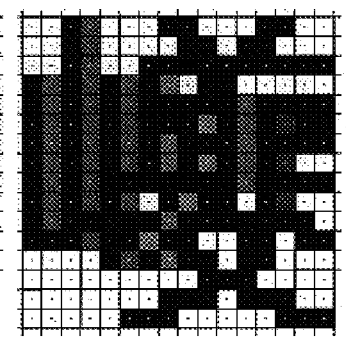
Fig. 22A        Fig. 22B        Fig. 22C
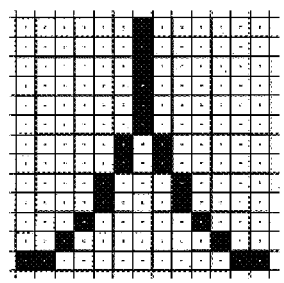 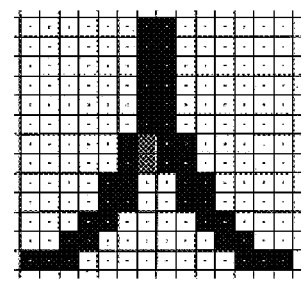 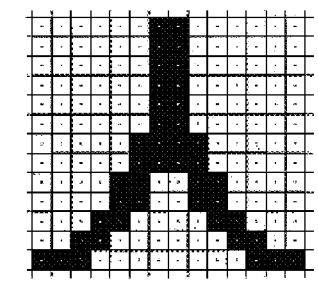
Fig. 23A        Fig. 23B        Fig. 23C Start of a "Tube"

End of a "Tube"

Column C

Row R

The "opening" is 3 pixels wide in its second row

"Opening" of length 3

"Tube" of length 2

○ 1st row of opening is only 1 pixel wide

▨ Pixel can be white or black

USE OF AN INPUT BLACK AND WHITE BITMAP TO GENERATE EMBOLDENED ANTI-ALIASING BITMAP

CROSS-REFERENCE TO RELATED APPLICATIONS

The present application claims the benefit of U.S. provisional patent application Ser. No. 60/640,868 entitled "Enhanced Simulated Emboldening" filed Dec. 30, 2004, which provisional patent application is incorporated herein by reference in its entirety.

BACKGROUND OF THE INVENTION

1. The Field of the Invention

The present invention relates to font rendering technology; and more specifically, to mechanisms for performing algorithmic simulated emboldening of font characters.

2. Background and Related Art

Computing technology enables a wide-variety of applications. Some of these applications interface with human beings by receiving input from a human user via, for example, a mouse, keyboard, microphone, camera, or the like, or by providing output to a human user via, for example, a speaker, display or printer. In particular, since sight is such a dominant human sensory capability, human users typically rely on some sort of printer or display in order to interpret computational results and/or to interface with an application.

One type of displayed material is characters. Sets of characters (whether it be text or otherwise) may often be logically grouped together. A font represents an example of a logical grouping of characters. In particular, a font is a set of printable or displayable characters in a specific style and size. The characters of the font are often termed "glyphs".

Characters (glyphs) of a font can be described by outlines or by embedded bitmaps. An outline describes the character by describing the contours of the character shape. Such outlines are more easily scalable. During the rasterization process, software may convert the outline into a bitmap that is suitable for display given the desired point size or Pixels Per EM (ppem).

Embedded bitmaps are usually manually pre-designed bitmap images that correspond to specific ppems. Embedded bitmaps usually are present only for low and middle ppems and for those ppems that usually require higher image quality than those that result from rasterization of unhinted outlines. Hinting is a conditional modification of the outlines which presents another way (compared to embedding bitmaps) of improving quality of the rendered results for low ppems.

Traditionally, characters in fonts with relatively small numbers of characters and relatively simple character shapes (such as Latin) are described by hinted outlines. On the other hand, characters in fonts with large number of characters and relatively complex character shapes (such as East Asian fonts, hereinafter also referred to as EA) are described by unhinted outlines and usually by a series of embedded Black and White bitmaps (hereinafter also referred to as BW). Those more complex fonts usually have embedded bitmaps for some, but not necessarily all, low and middle ppems. Furthermore, the embedded bitmaps do not necessarily cover the full repertoire of the characters in the font. Very rarely, fonts contain Anti-Aliasing (herein after also referred to as AA) embedded bitmaps. Very few, if any, fonts contain embedded bitmaps in CLEARTYPE® (hereinafter also referred to as CT) format.

In some circumstances, it is desirable to "bold" characters. Bolded characters tend to have a heavier visual or typographic weight. Bolded characters are often provided in place of their counterpart regular weight characters. There are a number of instances in which it may be desirable to bold characters. For example, characters are often bolded to emphasize the meaning conveyed by the characters.

A font has a true bold version if there are separate designs of the font characters representing heavier weight and those designs are stored in a way recognizable by the rendering software as being associated with the original font. True bold designs associated with characters of a font do not necessarily follow a uniform bolding transformation with respect to the characters of the original regular weight font. Different elements of the characters are emboldened in the different ways, as appropriate, given the unique form of the character. Often, a human being is involved with the custom design of bolded fonts so as to take into account a host of subjective aesthetic judgments that contribute to a more authentic high quality bolded look.

Traditionally, most commonly-used fonts with smaller numbers of characters and relatively simple character shapes (such as Latin fonts) have associated true bold versions. However, due to the time and cost associated with custom design of fonts, most of the bigger fonts with more complicated characters and larger numbers of characters do not have associated true bold versions. Furthermore, the design of such true bold fonts for these complex character sets can be prohibitively expensive. As a result, if a user chooses a bold option, a simulated emboldening is executed by a rendering engine.

Simulated emboldening is an automatic, algorithmic procedure performed by a rendering engine based on the data from the regular font. Currently applied simulated emboldening is performed by a uniform algorithm that is not always sensitive to the original design intent or to the numerous subjective judgments that improve the quality and appearance of the bolded font data.

Although currently applied algorithms for simulated emboldening provide quite legible results for the fonts with simpler characters, such algorithms usually fail to provide legible results for the fonts with more complex and dense characters.

In a simplified view, the rendering process may be divided into three stages. In the first stage, information from the font file is accessed and, if needed, translated into a rasterizer-readable format. In the second stage, the rasterization process occurs in which the rasterizer-readable font format is converted into a two dimensional-array of values called a bitmap. The bitmap will have one value per pixel for a "simple bitmap", and more than one value per pixel for an "overscaled bitmap" as is the case for a CLEARTYPE® bitmap. The value may be a simply binary value (e.g., a zero or a one) for a Black and White (BW) bitmap, or a range of values (e.g., from 0 to 16) for an AA bitmap. In the third stage, the actual mapping of the bitmap values to the pixels (or pixel sub-components) of the display occurs resulting in the character being displayed.

Simulated emboldening happens at the second stage during the rasterization process. Although the third stage of mapping the bitmap values to the display may influence the choice of a particular emboldening algorithm and/or tuning the parameters once an algorithm is chosen, particular kinds of mappings can be omitted from the description for clarity in describing the basic principles and embodiments of the present invention. As simulated emboldening algorithms occur during the second stage of rasterization process, the second stage processing will be the primary stage that is discussed herein.

Currently, there are three primary rendering modes; namely, Black and White (BW), Anti-Aliasing (AA) and CLEARTYPE® (CT). Conventionally, at the rasterization stage, the rendering mode defines the final format of the bitmaps and, in particular, the output format of the emboldened bitmaps if emboldening is applied.

There are a variety of factors that may influence a choice of the rendering mode. Such factors may include, for example, device properties and settings, requested ppem, font data (for example, presence of the embedded bitmaps, presence and content of the "gasp" table (as in an OPENTYPE®/TrueType font file)), presence and kind of any geometrical transformation requested. Other factors can influence the choice of the rendering mode. For example, the "complexity" of the font may be considered in choosing the rendering mode. For example, it may be decided to apply BW rendering mode and make use of embedded BW bitmaps for relatively complex fonts and apply CT rendering mode and completely ignore embedded BW bitmaps for relatively less complex fonts.

The choice of rendering mode does not necessary fully realize all the possibilities of the display device. In many situations, the choice is made by software and is based on the general experience of the different rendering modes being more or less legible for the human eyes under different conditions. For example, at low ppem, the AA rendering mode usually provides lower quality rendering results than the BW mode, especially if a font contains BW embedded bitmaps. Therefore, a flag in the "gasp" table can force the BW rendering mode to be applied when rendering low ppem characters, even though the great majority of the display devices can display shades of gray. The same is true regarding CLEARTYPE®. For example, it might be decided to apply BW rendering mode for relatively complex fonts at lower ppems where the embedded BW bitmaps are present in the font, even though the display device has the capability to render in CT mode. The selected rendering mode should provide the best user experience, and can be changed if another rendering mode appears to provide better rendering results.

Currently, regular weight and bold weight characters are commonly rendered in the same rendering mode assuming that all other conditions are the same. However, this decision does not reflect any internal requirements and can be overwritten if another approach will be shown to produce better rendering results.

Current algorithms for bitmap emboldening commonly use the same types of bitmaps for input and output, which means that for an emboldening algorithm, the rendering mode currently implicitly establishes both input and output types. However this dependency is not generically necessary.

The rasterization process goes through the same major steps for the regular and the simulated bold weights. One difference is that if a form of simulated emboldening is applied, an additional emboldening step is used in the rasterization process. This emboldening step intercepts the flow of rasterization as it would be performed for a regular weight, performs necessary emboldening operations, and then lets the flow of the rasterization continue exactly as in the case of a regular weight. Therefore, there will now be some general background description of rasterization for the regular weight so that the emboldening step may be understood in its proper rasterization context.

A rasterizer might accept a lot of different parameters related to specific characteristics of a font or to different rendering conditions being requested. For the purpose of describing the conventional model of simulated emboldening, we will concentrate on the following input information given to a rasterizer:

Information regarding identification of a character being requested (for example a Unicode character code).

Information regarding rendering conditions such as size (ppem), presence of a non-identical geometrical transformation, request for simulated emboldening. If a simulated emboldening is requested, some additional parameters identifying "heaviness" (amount of emboldening) and direction of the emboldening will be passed to the rasterizer (described below in more detail).

Information coming from the font file: such as whether an embedded bitmap is present for a particular character or sum of the characters for the same conditions, access to the description of the embedded bitmap or/and the outline data for a specific character, information specified by designers such as a preferred rendering mode for particular ppems.

Information regarding the rendering mode (which defines the format of the resulting bitmap): specification of the rendering mode BW, AA or CT and any additional required information (for example, in the case of AA emboldening—requested number of gray levels).

The rasterizer will perform appropriate rasterization based on the input information, and will provide a resulting bitmap in the format corresponding to the requested rendering mode, along with metric information related to the size and positioning of the resulting bitmap.

Since the new algorithms for the emboldening simulation described in the detailed description of the preferred embodiments section below are not intended to necessarily modify the metric information, the bitmap output of the conventional rasterization processes will now be described.

The rasterization process for conventional BW rendering will now be described with respect to a specific example and with respect to FIG. 1. In the BW rendering mode, a rasterizer will usually use the embedded BW bitmap if present. In the example of FIG. 1, suppose that the Unicode "GREEK CAPITAL LETTER MU" is to be rendered. If there is a BW bitmap for the character and requested conditions (in FIG. 1, branch "(BW: Embedded BW Simple Bitmap)"), then the embedded BW bitmap is used for rasterization. The BW values from the rasterizer are then mapped to the actual pixel colors by software outside of the rasterizer.

If there is not a BW bitmap for the character and requested conditions (in FIG. 1, branch "(BW: Outline to Simply Bitmap)"), then a simple bitmap is rendered using the outline information present in the font by applying a scan-conversion algorithm to the outline. The reason that an embedded bitmap is used if present is that for unhinted fonts, a bitmap produced by rendering of an outline usually has lower quality than an embedded bitmap.

Whichever approach is being used, the final output has the same format: simple BW bitmap. An important characteristic of this rasterization process is that it does not use overscaled bitmaps at any intermediate steps of computation of the final output bitmap. There is only one value per pixel at all stages of the computation.

The rasterization process for conventional AA rendering will now be described with respect to a specific example and with respect to FIGS. 2A and 2B. In AA rendering mode, a rasterizer usually uses an embedded AA bitmap if present (in FIG. 2A, branch "(AA: Embedded AA Simple Bitmap)") in a font to be rendered. Since almost no fonts have embedded AA bitmaps, branch (AA: Embedded AA Simple Bitmap) is almost never executed.

On the other hand, if an embedded bitmap is not present for a character and requested conditions, a simple AA bitmap is rendered using the outline information present in the font (in FIG. 2A, branch "(AA: Outline to Overscaled Bitmap)" continuing in FIG. 2B to branch "(AA: Overscaled to Simple Bitmap)". When rasterization starts from the outline information, rasterization proceeds through two independent stages: (AA: Outline to Overscaled Bitmap) and (AA: Overscaled to Simple Bitmap). The algorithm for computation of the overscaled bitmap based on the outline data used during stage (AA: Outline to Overscaled Bitmap) and algorithm for computation of the final values of the simple AA bitmap during stage (AA: Overscaled to Simple Bitmap) do not depend on each other, and can be modified independently as long as they work with the required input and output formats.

Whichever approach is being used, the final output has the same format: simple AA bitmap. An important characteristic of this rasterization process is that when there is no embedded AA bitmap, the rasterization process uses an overscaled bitmap as an intermediate result of computation of the final output bitmap.

Now that the rasterization process has been described generally for each of the BW and AA rendering modes, the description proceeds to conventional BW and AA emboldening algorithms. Depending on the type of input, algorithms for the emboldening simulation are subdivided into two large groups: "bitmap emboldening" and "outline emboldening". In addition to the various emboldening parameters, a bitmap emboldening algorithm accepts a bitmap as its input, while an outline emboldening algorithm accepts an outline as its input. Bitmap emboldening returns a bitmap as its output, while outline emboldening returns a modified outline, which later will be scan-converted in order to produce a bitmap.

Bitmap and outline emboldening algorithms are applied at different stages of the rasterization process. Outline emboldening will be always applied before the first step of the rasterization process as it would be performed for a regular weight. After an outline emboldening is performed, the rasterization will continue exactly as it would in the case of a regular weight.

Currently, outline emboldening is almost never applied. Bitmap emboldening is performed by most of the applications in most situations, except in the rare cases when a non-trivial geometrical transformation is applied to a text. The capability of applying bitmap emboldening does not depend on the character having an embedded bitmap. Bitmap emboldening can thus be applied to characters that either have, or do not have, an embedded bitmap. If the character does not have an embedded bitmap for the requested condition, the result of scan-conversion based on the outline information will serve as an input for a bitmap emboldening algorithm. The principles of the present invention apply more to bitmap emboldening and thus several conventional bitmap emboldening algorithms will now be described.

By definition, bitmap emboldening algorithms accept bitmaps as their input and return bitmaps as their output. In addition to the bitmap itself, a bitmap emboldening algorithm usually accepts information regarding heaviness and direction of emboldening. This information can be expressed by a pair of "emboldening shifts" in the horizontal and vertical directions respectively. An emboldening shift identifies by which amount (expressed in pixels) an emboldened bitmap should be visually heavier than the original one and a sign of a shift shows the direction (to the right/to the left and to the top/to the bottom) of the emboldening. Most of the current applications work with emboldening shifts corresponding to the whole numbers of pixels only. In addition, at low/middle and even at the lower range of high ppems (e.g., up to about 50 ppem), simulated emboldening by 1 pixel to the right (and 0 pixels in the vertical direction) is usually applied.

The input bitmap can originate from different data (such as embedded bitmap or a glyph's outline) and can be computed in different ways. The particular way the input bitmap is computed is irrelevant for the emboldening algorithm that is applied to the bitmap. What matters is which format of an input bitmap is expected by an emboldening algorithm and which format of an output bitmap the algorithm will generate. The various emboldening algorithms will thus be distinguished based on the format of the input and output bitmaps.

Different kinds of bitmap emboldening algorithms can be applied at different steps of the rasterization process since different steps of the rasterization process work with bitmaps in different formats. However currently applied bitmap emboldening algorithms often start with simple bitmaps (in BW, AA or CT format) and generate simple bitmaps in the same format as their input.

Most of the currently applied bitmap emboldening algorithms work with simple bitmaps both as input and output, even during a rasterization process that involves computation of overscaled bitmaps. If overscaled bitmaps are computed, emboldening is applied after the overscaled bitmap is converted into a simple bitmap.

In addition, most of the currently applied bitmap emboldening algorithms have exactly the same output bitmap format as the input bitmap format.

Furthermore, the algorithms often turn on or make darker some of the pixels that were off or had lighter colors in the input bitmap, and often do not turn off pixels or make them lighter.

Also, conventional algorithms typically decide whether to modify a value of a specific pixel based on the local characteristics of the input bitmap, such as one (for low/middle ppems) or several neighboring pixels in the direction of the emboldening. Currently used algorithms do not use information of the neighboring pixels in the direction perpendicular to the emboldening.

Moreover, conventional algorithms work row-by-row (for horizontal emboldening) and column-by-column (for vertical emboldening) and, therefore, the algorithms analyze only one direction (either horizontal or vertical) at a time. In other words, the resulting value of a pixel depends on neighbors of a pixel either in the row only or in the column only and does not take into account a two-dimensional neighborhood.

Currently applied bitmap emboldening algorithms can be applied in the horizontal or vertical direction. Algorithms for horizontal and vertical directions are essentially symmetric, with change of the directionality only. Generally, the algorithms for horizontal and vertical emboldening do not intermix. In other words, if the emboldening should be applied in both directions, then it will first be applied in one direction and then applied in another direction to the result of the emboldening in the first direction.

Furthermore, besides the rectangular pixel area containing the input bitmap, the algorithms usually affect one or several rows and/or one or several columns adjacent to the rectangular area, depending on the values of the emboldening shifts accepted as the parameters.

For low/middle ppems (i.e., up to about 50 ppem), the algorithms usually apply emboldening by 1 pixel in the horizontal direction to the right. Note, that the low/middle ppems are exactly the area where the quality of the rendered images is especially challenging and where an improvement of the existing algorithms is especially required.

As illustrated by FIG. 3A, in BW rendering mode, a conventional emboldening algorithm accepts a BW simple bitmap as an input, and generates a BW simple bitmap as an output. The emboldening algorithm is performed at the end of the rendering process as it would be applied in the case of a regular weight (see, for example, FIG. 1 of this description).

Specifically, if an embedded bitmap is present in the font for the requested condition (YES in FIG. 3A), the BW emboldening algorithm also called hereinafter "(BW: Bitmap Simple Regular to Bitmap Simple Bold)" is applied to the output bitmap of the step called hereinafter "(BW: Embedded BW Simple Bitmap)" (see left half of FIG. 1). Alternatively, if an embedded bitmap is not present in the font for the requested condition (NO in FIG. 3A), the step (BW: Bitmap Simple Regular to Bitmap Simple Bold) is performed after the step called hereinafter "(BW: Outline to Simple Bitmap)" (see right half of FIG. 1) if the rasterization is based on the outline data.

The requirement in (BW: Bitmap Simple Regular to Bitmap Simple Bold) for both input and output bitmaps to be BW simple bitmaps is quite inflexible. Subject to these restrictions, the emboldening algorithm can only turn on (i.e. assign value 1 to) some of the pixels in the output bitmap that were turned off (had value 0) in the input bitmap.

For example, in the case when a bitmap should be emboldened by 1 pixel to the right in the horizontal direction, a commonly used algorithm called herein "<BW: Alg Standard>" works as follows. For every row in the original bitmap, turn on all the pixels that have a "black" (i.e., turned on) immediate left neighbor.

An example of application of the algorithm is shown in both FIGS. 3B and FIG. 3C, in which the input and output of the algorithm are shown after a mapping to black and white colors by software external to the rasterizer. As can be seen from FIG. 3B, the algorithm <BW: Alg Standard> performs a completely reasonable operation considering the restrictions. However, the character in FIG. 3C is rendered using the same emboldening algorithm. As apparent from FIG. 3C, the emboldening algorithm causes the output character to become unrecognizable if the character is relatively complex.

As illustrated by FIG. 4A, in AA rendering mode, conventional emboldening algorithms accepts an AA simple bitmap as an input and generates an AA simple bitmap as an output. The emboldening algorithm waits till the end of rendering process as it would be applied in the case of a regular weight. Specifically, for rendering of a character that has an AA bitmap for a requested condition (YES in FIG. 4A), a simple AA bitmap is generated based on the embedded AA bitmap data as represented in the step (AA: Embedded AA Simple Bitmap) (see, left half of FIG. 2A). On the other hand, for rendering of a character that does not have an AA bitmap for the requested condition (NO in FIG. 4A), a simple AA bitmap is generated using steps (AA: Outline To Overscaled Bitmap) and (AA: Overscaled to Simple Bitmap) (see the right half of FIG. 2A) based on the outline of the character. In either case, the AA emboldening step called hereinafter "(AA: Bitmap Simple Regular to Bitmap Simple Bold)" is applied to the output bitmap.

A conventional AA emboldening algorithm called hereinafter "<AA: Alg Standard>" operates on the simple AA bitmap, which, for every pixel, represents the number of turned on subpixels in the overscale bitmap. The algorithm works according to a simple "additive" principle, accumulating numbers of turned on subpixels for the adjacent pixels. The algorithm does not work with exact positions of subpixels inside a pixel, but rather with the cumulative information regarding the number of turned on subpixels within a pixel.

Although the algorithm works with these cumulative values only, the results are quite similar to the simplest algorithm that would work directly on the overscaled bitmap uniformly emboldening the overscaled bitmap by the number of subpixels in a pixel, which provides a reasonable justification for the conventional algorithm. The problem is, however, that for more complex characters, the current algorithm does not produce legible results.

For emboldening by 1 pixel to the right, a conventional AA emboldening algorithm <AA: Alg Standard> is as follows:

1) For every row in the original bitmap, proceed from right to the left.
2) For every pixel:
   2a) Add a value of the immediate left neighbor to the value of the pixel itself.
   2b) If the resulting value exceeds the maximal value allowed in the specific format, assign the maximal value to the pixel.

An example of the application of the algorithm is shown in FIG. 4B. This example continues the example related to the "wave" character given above (in FIGS. 2A and 2B) with relation to the rendering in AA mode for a regular weight.

Accordingly, what would be advantageous are BW and AA simulated emboldening mechanisms in which the emboldened character is more legible and readable, even for complex characters.

BRIEF SUMMARY OF THE INVENTION

The principles of the present invention relate to mechanisms and methods for emboldening an input Black and White bitmap. After accessing the input Black and White bitmap, a simulated emboldening uses the input Black and White bitmap to generate an emboldened Anti-Aliasing bitmap, thereby improving the appearance and readability of the emboldened character as compared to conventional simulated emboldening techniques.

Additional embodiments of the invention will be set forth in the description that follows, and in part will be obvious from the description, or may be learned by the practice of the invention. The embodiments of the invention may be realized and obtained by means of the instruments and combinations particularly pointed out in the appended claims. These and other embodiments of the present invention will become more fully apparent from the following description and appended claims, or may be learned by the practice of the invention as set forth hereinafter.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 2A and 2B illustrates a flowchart of a conventional rasterization process for Anti-Aliasing rendering;

FIG. 4B illustrates an example of a conventional simulated Anti-Aliasing emboldening in which a simple character is emboldened;

FIG. 9A illustrates a sample input Black and White bitmap;

FIG. 9B illustrates an emboldened Anti-Aliasing output bitmap resulting from application of a simulated emboldening method to the input Black and White bitmap of FIG. 9A in accordance with the principles of the present invention;

FIG. 9C illustrates an emboldened Black and White output bitmap resulting from application of a simulated emboldening method to the input Black and White bitmap of FIG. 9A in accordance with the principles of conventional simulated Black and White emboldening;

FIG. 10 illustrates actual results of emboldening in accordance with the principles of the present invention as compared against conventional simulated emboldening;

FIG. 11A illustrates in input 3×3 Black and White input bitmap;

FIG. 11B illustrates a resulting output Anti-Aliasing bitmap resulting from a simulated emboldening method in accordance with the principles of the present invention in which vertical contextual information is taken into account in the emboldening, and in which the central pixel is represented using 16 divisions;

FIG. 14A illustrates an example input Black and White bitmap;

FIG. 14B illustrates the input Black and White bitmap of FIG. 14A in which pixels are highlighted that belong to a path as defined under one definition of the term "path";

FIG. 14C illustrates the input Black and White bitmap of FIG. 14A in which pixels are highlighted that belong to several paths as defined under another definition of the term "path";

FIG. 14D illustrates the input Black and White bitmap of FIG. 14A in which pixels are highlighted that belong to several paths as defined under a third definition of the term "path";

FIG. 14E illustrates the input Black and White bitmap of FIG. 14A in which pixels are highlighted that belong to several paths as defined under a fourth definition of the term "path";

FIG. 15A illustrates an example input Black and White bitmap;

FIG. 15B illustrates the example input Black and White bitmap of FIG. 15A, with two vertical "legs" that each serve as a path;

FIG. 16 illustrates the Black and White input bitmap of FIG. 14A with two separate "paths" highlighted for application of path averaging;

FIG. 18 is a flowchart showing a context for the simulated emboldening;

FIG. 19 shows the application of a contextual method for assigning a middle gray level based on contextual information;

FIG. 20A illustrates an example input Black and White bitmap;

FIG. 20B illustrates a result of a calculation of an initial amount of emboldening to the input Black and White bitmap of FIG. 20A;

FIG. 21A illustrates an example input Black and White bitmap;

FIG. 21B illustrates the results of emboldening after averaging to the input Black and White bitmap of FIG. 21A in accordance with the principles of the present invention;

FIG. 22A illustrates an example input Black and White bitmap;

FIG. 22B illustrates the application of a conventional simulated emboldening to the input Black and White bitmap of FIG. 22A;

FIG. 22C illustrates the application of simulated emboldening in accordance with the principles of the present invention to the Black and White bitmap of FIG. 22A;

FIG. 23A illustrates an example input Black and White bitmap;

FIG. 23B illustrates the application of simulated emboldening in accordance with the principles of the present invention to the Black and White bitmap of FIG. 23A, only without the application of "cap correction";

FIG. 23C illustrates the application of simulated emboldening with "cap correction" in accordance with the principles of the present invention to the Black and White bitmap of FIG. 23A;

DETAILED DESCRIPTION OF THE PREFERRED EMBODIMENTS

Figure 1:
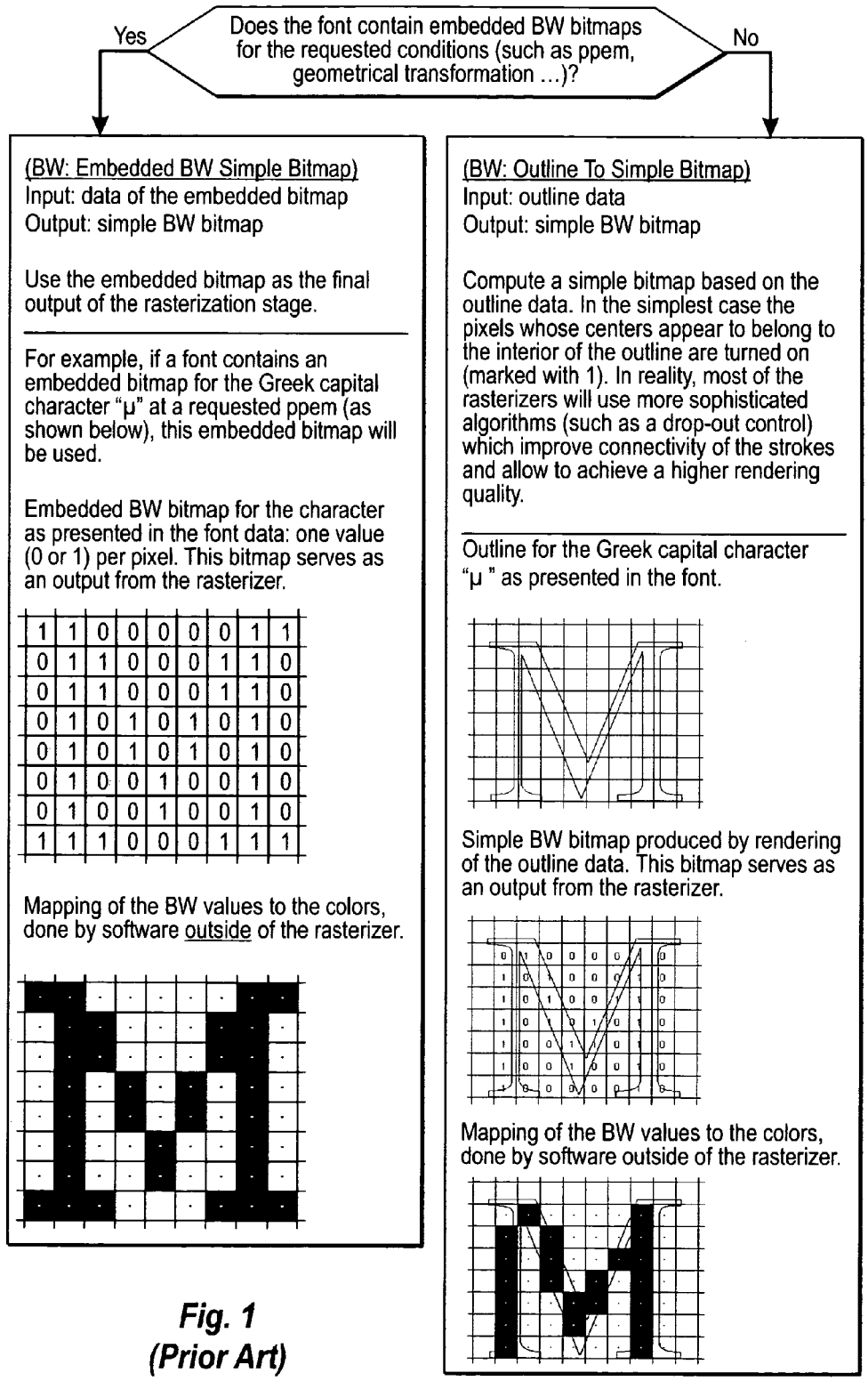
FIG. 1 illustrates a flowchart of a conventional rasterization process for Black and White rendering.
Figure 2A:
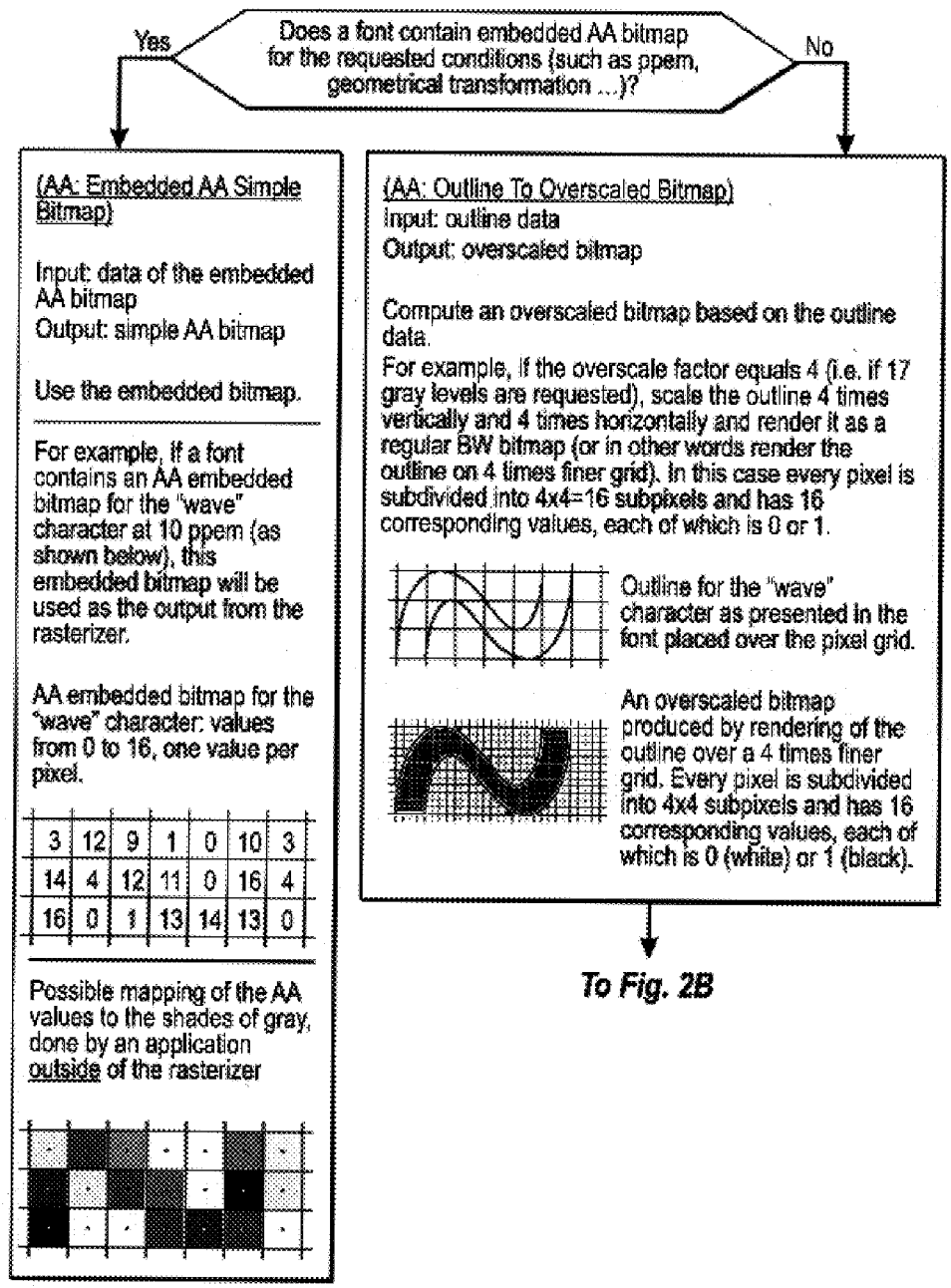
Figure 3A:
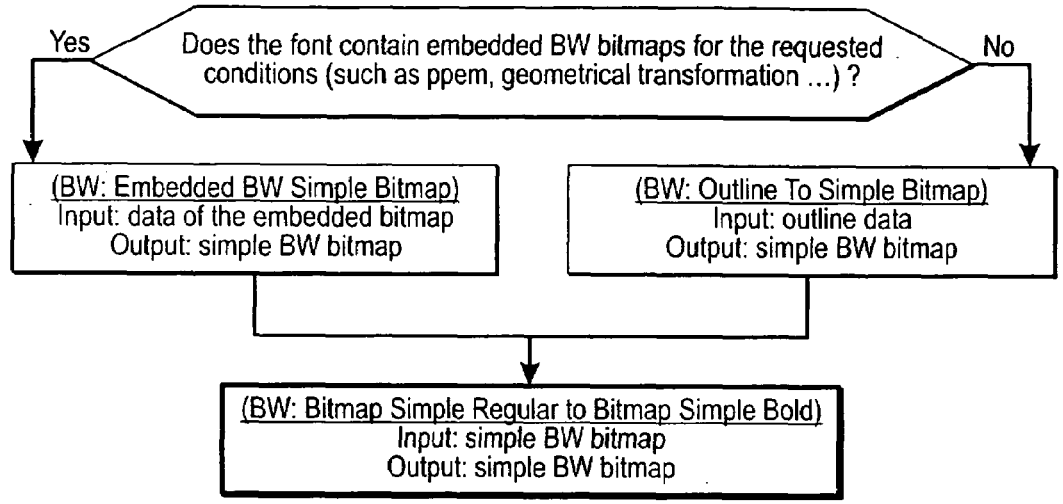
FIG. 3A illustrates a flowchart showing context for a conventional Black and White simulated emboldening method.
Figure 3B:
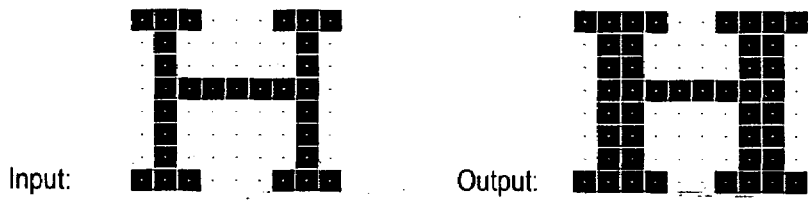
FIG. 3B illustrates a first example of a conventional simulated Black and White emboldening in which a simply character is emboldened.
Figure 3C:
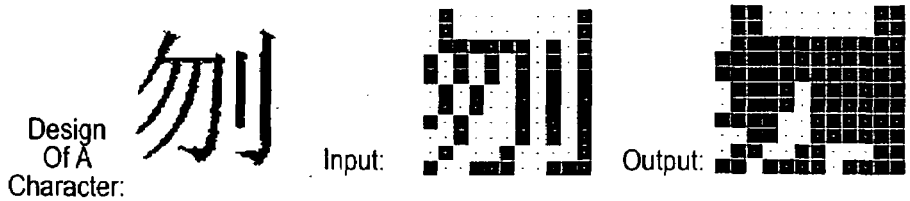
FIG. 3C illustrates a second example of a conventional simulated Black and White emboldening in which a complex character is emboldened.
Figure 4A:
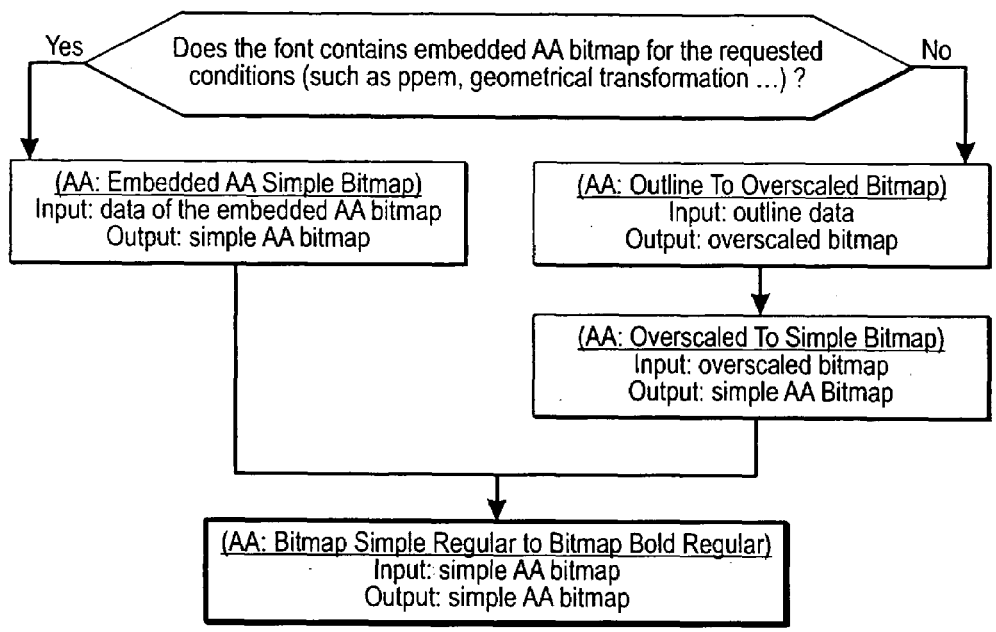
FIG. 4A illustrates a flowchart showing context for a conventional simulated Anti-Aliasing emboldening method.

The principles of the present invention relate to improved simulated emboldening mechanisms that substantially improve legibility and readability for emboldened characters, even for intricate and complex characters and/or characters displayed at small point sizes. The simulated emboldening methods start from a simple BW bitmap and result in a simple AA emboldened bitmap.

Prior to describing the details of the present invention, a suitable computing architecture that may be used to implement the principles of the present invention will first be described with respect to FIG. 5. In the description that follows, embodiments of the invention are described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the principles of the invention are being described in the foregoing context, it is not meant to be limiting as those of skill in the art will appreciate that several of the acts and operations described hereinafter may also be implemented in hardware.

Turning to the drawings, wherein like reference numerals refer to like elements, the principles of the present invention are illustrated as being implemented in a suitable computing environment. The following description is based on illustrated embodiments of the invention and should not be taken as limiting the invention with regard to alternative embodiments that are not explicitly described herein.

Figure 5:
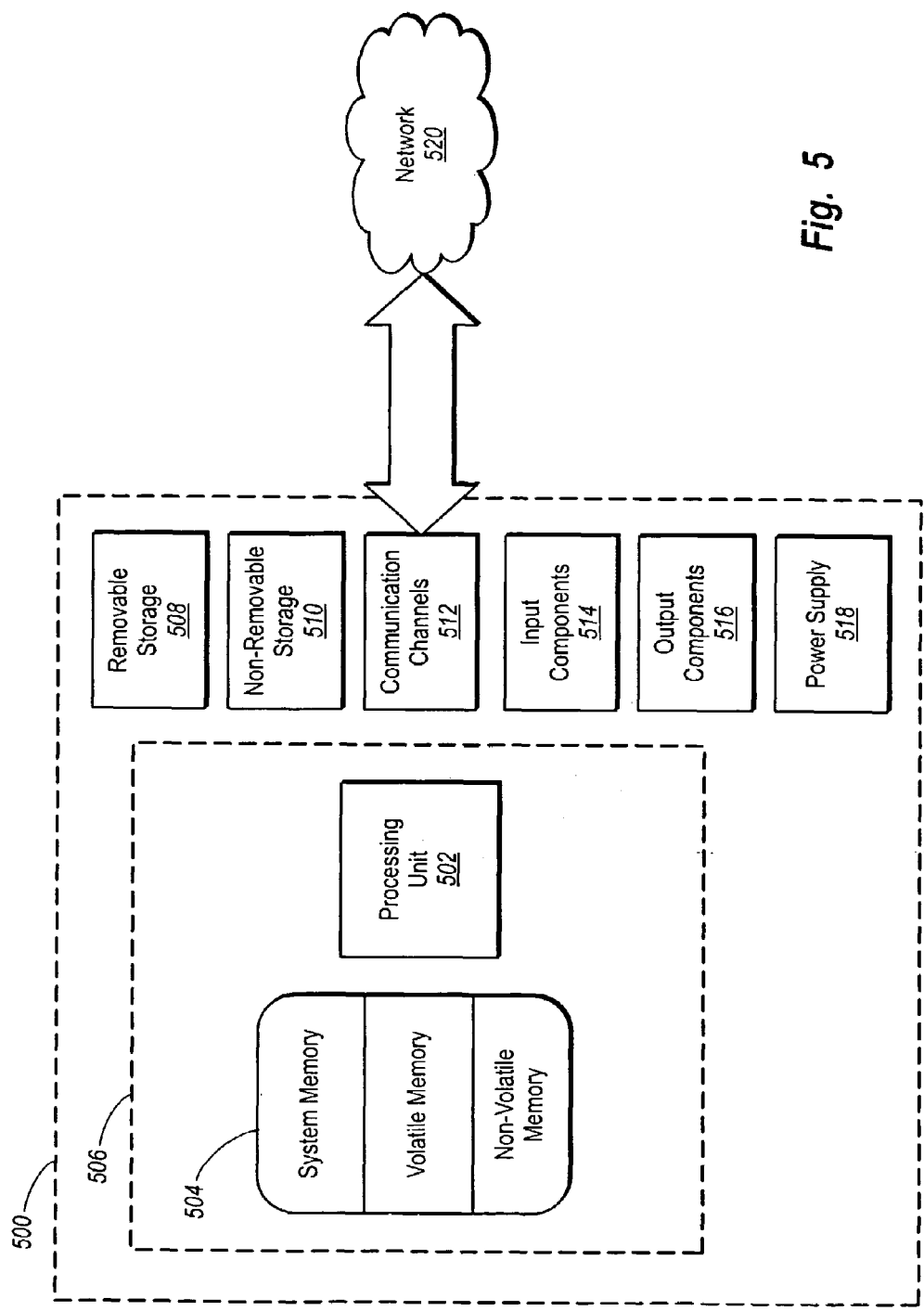
FIG. 5 illustrates an example computing environment in which the principles of the present invention may be practiced.

FIG. 5 shows a schematic diagram of an example computer architecture usable for these devices. For descriptive purposes, the architecture portrayed is only one example of a suitable environment and is not intended to suggest any limitation as to the scope of use or functionality of the invention. Neither should the computing systems be interpreted as having any dependency or requirement relating to any one or combination of components illustrated in FIG. 5.

The principles of the present invention are operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 500 typically includes at least one processing unit 502 and memory 504. The memory 504 may be volatile (such as RAM), non-volatile (such as ROM, flash memory, etc.), or some combination of the two. This most basic configuration is illustrated in FIG. 5 by the dashed line 506. In this description and in the claims, a "computing system" is defined as any hardware component or combination of hardware components capable of executing software, firmware or microcode to perform a function. The computing system may even be distributed to accomplish a distributed function.

The storage media devices may have additional features and functionality. For example, they may include additional storage (removable and non-removable) including, but not limited to, PCMCIA cards, magnetic and optical disks, and magnetic tape. Such additional storage is illustrated in FIG. 5 by removable storage 508 and non-removable storage 510. Computer-storage media include volatile and non-volatile, removable and non-removable media implemented in any method or technology for storage of information such as computer-readable instructions, data structures, program modules, or other data. Memory 504, removable storage 508, and non-removable storage 510 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 500 may also contain communication channels 512 that allow the host to communicate with other systems and devices over, for example, network 520. Communication channels 512 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 500 may also have input components 514 such as a keyboard, mouse, pen, a voice-input component, a touch-input device, and so forth. Output components 516 include screen displays, speakers, printer, etc., and rendering modules (often called "adapters") for driving them. The computing system 500 may use the output components 516 and associated adapters for rendering the emboldened characters generated by any of the emboldening techniques described below. The computing system 500 has a power supply 518.

Having described a suitable computing environment in which the principles of the present invention may be employed, simulated emboldening methods in accordance with the principles of the present invention will now be described. The simulated emboldening generally improves the quality of the emboldened character as compared to conventional emboldening algorithms that use the simple BW bitmap as input such as, for example, the (<BW: Alg Standard>) method described above. The simulated emboldening methods described hereinafter may apply successfully to the font regardless of whether or not there are embedded bitmaps. Furthermore, the specific number of the requested gray levels in the output image for the simulated emboldening methods described hereinafter are generic, and can fit any requested number of the gray levels, although most of the examples shown below will correspond to 17 gray levels output corresponding to 0, 1, 2, . . . 16.

The simulated emboldening methods may operate under several general principles. According to a first general principle referred to herein as <Gen:1>, the methods start from a simple BW regular bitmap as an input and create an output of the emboldening algorithm as a simple bitmap in AA (rather than in BW) format. Thus, the input and output of the emboldening methods can have different formats, unlike conventional simulated emboldening methods. This flexibility allows the output of the emboldening methods to be more legible and readable, since the output bitmap is not limited to two binary values per pixel.

Figure 6A:
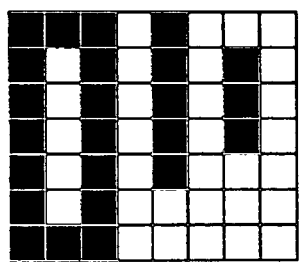
FIG. 6A illustrates a sample Black and White input bitmap to be emboldened.
Figure 6B:
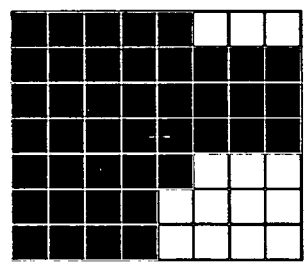
FIG. 6B illustrates an output Black and White input bitmap emboldened by a conventional Black and White simulated emboldening method in which all white pixels having a black left neighbor pixel are turned black.
Figure 6C:
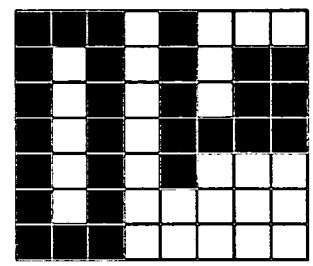
FIG. 6C illustrates an output Black and White input bitmap emboldened by a conventional Black and White simulated emboldening method in which all white pixels having a black left neighbor pixel are turned black unless the pixel also has a black right neighbor pixel.

For example, consider FIG. 6A in which the BW bitmap is to be emboldened subject to the conventional restriction that the output bitmap is also a BW bitmap. The input bitmap of FIG. 6A has several vertical parallel strokes, 1 pixel apart one from another. Suppose now that there is a request to embolden the character by 1 pixel to the right. Conventional "BW to BW" emboldening methods may add a black pixel to the right of every black pixel in each vertical stroke resulting in the BW bitmap of FIG. 6B. As can be seen from FIG. 6B, this obscures the original design of the character since all vertical strokes are merged with no visual separation. Alternatively, conventional "BW to BW" emboldening methods may leave the pixels between the vertical strokes white resulting in the BW bitmap of FIG. 6C. This leaves the vertical strokes visually intact, but leaves the emboldened bitmap with a visual appearance very similar to that of the regular weight bitmap, thereby frustrating the purpose of emboldening.

The <Gen:1> principle extends the possibilities of the shading choices for a pixel, which is advantageous in situations when there is not enough space between elements of the input bitmap. The principle allows a proper balance in which the emboldened bitmap looks significantly heavier than the regular bitmap, while retaining the original design.

From the "output" point of view, the <Gen:1> principle allows that an AA output of an emboldening simulation (which is also an output of the entire rasterization process in this case) may not necessary originate from an AA bitmap as the starting point. As previously indicated, relatively few fonts contain embedded AA bitmaps. Furthermore, for regular weight and for low/middle ppem results of rendering in AA mode have significantly lower quality than those of rendering in BW mode. Therefore, the principle <Gen:1> implies that the emboldening simulation method can start from much better quality input bitmaps than are currently used in "AA to AA" emboldening methods. Since EA fonts and the majority of other fonts with significant number of dense/complex characters usually contain embedded BW bitmaps at least for the most complex characters at low/middle ppems (approximately in the range 10-22 ppem), starting from a BW bitmap gives an immediate and extremely important advantage of being able to use the hand-tuned bitmap designs (rather than rendering from outlines) whenever possible.

A second general principle called herein <Gen:2> is that an emboldening algorithm should avoid complete blocking of the white spaces between elements of the input BW bitmap, since such blocking often results in loss of legibility of the emboldened character as explained above. Assigning lighter gray level values to the pixels between black pixels of the input bitmap at least partially solves the problem. Assigning new black pixels between black pixels of the input bitmap might lead to loss (either globally or locally) of the original design for complex/dense characters. In contrast, assigning gray values instead allows for visual separation between elements of the input bitmap and prevents the design from being completely lost.

Figure 7:
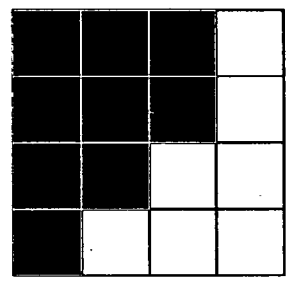
FIG. 7 illustrates a single pixel conceptually subdivided into 16 sections.

Maintaining visual separation between elements of the input bitmap by assigning gray levels will be explained with respect to FIG. 7. In AA rendering mode, the conventional conversion from an overscaled bitmap to the simple AA bitmap is done by counting black subpixels for every pixel. In other words, for a specific pixel, the gray level is obtained from the fraction of the pixel that is black in the overscaled bitmap. For example, for an overscale factor 4 in both the horizontal and vertical directions as can be seen from FIG. 7, there are 16 subpixels per pixel. In the configuration of the black subpixels shown in FIG. 7, the number of black subpixels is 9. Accordingly, the gray level assigned to the pixel will be 9/16.

In the design of an emboldening algorithm that maintains visual separation, the pixel may be conceptually subdivided into a number of subpixels. The designer may then imagine how the "subpixel" bitmap should look in order to maintain visual separation between existing elements of the input simple bitmap. The gray level may then be assigned to reflect the conceptual subpixel configuration of the pixel.

Figure 8A:
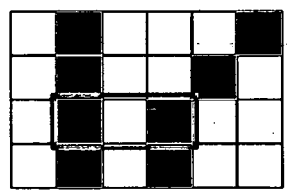
FIG. 8A illustrates a sample input Black and White bitmap in which three pixels are highlighted.
Figure 8B:
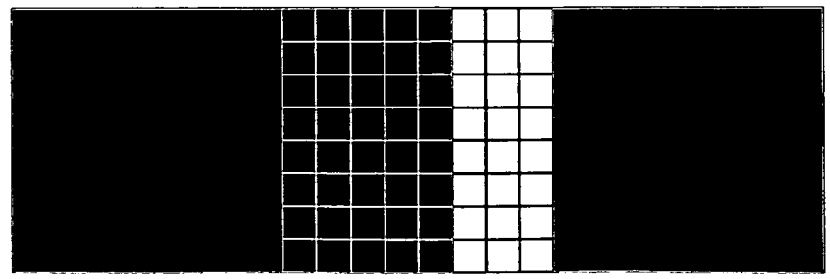
FIG. 8B illustrates the three highlighted pixels of FIG. 8A in expanded view in which the central pixel is conceptually subdivided into 64 components.

For example, suppose that each pixel may have one of 17 gray levels (from 0 to 16) assigned. Now suppose that the pixel configuration of a simple BW input bitmap shown in FIG. 8A is to be emboldened by 1 pixel to the right. FIG. 8B enlarges the three highlighted pixels of FIG. 8A, and subdivides the middle pixel into multiple subpixels. To design a heavier weight, some black or gray pixels are to be added to the right of the black pixels of the input bitmap. Suppose, for the three highlighted pixels of FIG. 8A, visual separation is to be maintained by "keeping a distance" of ⅜ from a pixel's right neighbor to prevent the strokes of the input bitmap from appearing to collide. We can conceptually subdivide the white highlighted pixel (see center pixel of FIG. 8B) and imagine how keeping a distance between visual elements will look in the overscaled bitmap. In this case, ⅝ of the center pixel should be black, which for a maximal gray level of 16 will result in an assigned gray level value equal to 10.

The following example shows how a simple emboldening algorithm that follows the principle <Gen:2> allows for improved quality of the rendering result. An example emboldening algorithm is as follows assuming that an emboldening shift of 1 pixel to the right is to be performed.
1) For every white pixel of the input bitmap having a black left neighbor,
   1a) Assign a maximal gray level (corresponding to the black color) if the right neighbor of the pixel is white, and
   1b) Assign a "middle" gray level if the right neighbor of the pixel is black (preventing complete blackening of the space between 2 black pixels of the original bitmap).

This means that we are "keeping approximately ½ pixel visual distance" between any two black pixels of the input bitmap that were separated by a white pixel. FIG. 9A through 9C show an application of the algorithm. In particular, FIG. 9A represents an input BW bitmap to be emboldened. FIG. 9B represents the emboldened AA bitmap that uses the algorithm just described. Referring to FIG. 9B, the resulting emboldened AA bitmap is not perfect. For example, the emboldened AA bitmap of FIG. 9B contains a "false serif" at the top part of the stroke (1) and results in a very uneven appearance of stroke (2). Still, the result is much better than one that is created by <BW: Alg Standard> shown in FIG. 9C which does not maintain visual distance.

FIG. 10 shows rendering results for several complex characters at the actual size. The first (top) line presents regular weight bitmaps, the second line presents results of emboldening according to the convention <BW: Alg Standard> method, the third (bottom) line presents results of the emboldening method just described. The third line has heavier visual appearance than the first line (therefore providing emboldening), and the third line is much more legible than the second line since the original design is largely maintained through visual separation of design elements.

A third general principle for the emboldening methods will be referred to as <Gen:3>. The principle <Gen:3> is that a gray scale value of a pixel assigned by an algorithm can be different for different pixels and can be computed based on any kind of "contextual" information, where the "context" need not be limited to information based on the immediate neighborhood in the direction of emboldening or to any other kind of local neighborhood. The adjusting to the variable characteristics of the input bitmaps allows, in turn, for improved quality of the resulting bitmaps by maintaining elements of a character's design and keeping balanced "heaviness" (locally and globally) specific to a character.

An algorithm described above in relation to principle <Gen:2> is actually a simple "contextual" algorithm since it assigns different gray values to the pixels depending on their right neighbors. This algorithm, however, analyzes data in the direction of emboldening only (for emboldening in horizontal direction, only immediate left and right neighbors will be considered as a "context" for a white pixel).

One algorithm that takes into account two-dimensional "context" (i.e. a pixel's neighborhood in both the direction of emboldening and a perpendicular direction) considers 4 neighbors of a pixel (left, right, top, bottom). For emboldening in the horizontal direction to the right with emboldening shift of 1 pixel, the algorithm may apply the following computation in order to assign a new value for a pixel:
1) For a white pixel, having black left neighbor
   1a) If the right neighbor of the pixel is white
      Assign the maximal gray value (i.e. color the pixel black)
   1b) Else (i.e. if the right neighbor of the pixel is black)
      Decrease the assigned maximal value by ¼,
      Decrease the assigned maximal value by additional 3/16 if the upper neighbor of the pixel is black, and
      Decrease the assigned maximal value by additional 3/16 if the lower neighbor of the pixel is black This algorithm allows for visual separation not only horizontally, but vertically as well. FIGS. 11A and 11B illustrates a basic application of this algorithm to a single pixel (the center pixel) in the context of a 3×3 array of pixels. FIG. 11A illustrates the input BW pixel configuration of an input BW bitmap. FIG. 11B illustrates the intermediate overscaled pixel configuration. We can conceptually subdivide a pixel into 4×4 subpixels as shown in the center pixel of FIG. 11B. If the pixel has a black right neighbor, we want to keep the last (rightmost) column of subpixels white. If, in addition, the pixel has a black upper or lower neighbor, we will keep the upper or lower row of subpixels white. In a configuration shown in FIG. 11B, the center white pixel will be assigned value 9 (assuming that the maximal gray level value is 16).

Figure 12A:
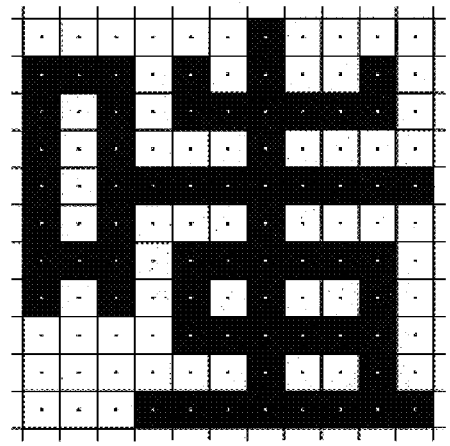
FIG. 12A illustrates an example input Black and White bitmap.
Figure 12B:
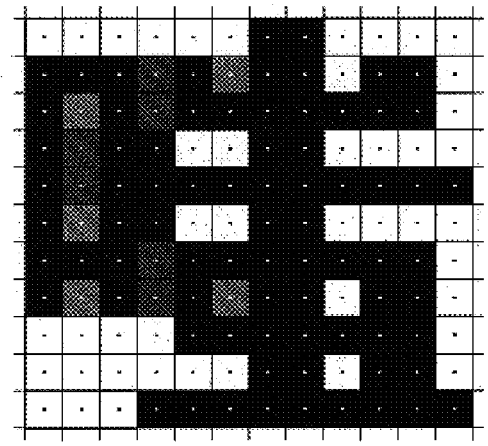
FIG. 12B illustrates the application an a simulated emboldening method to the input bitmap of FIG. 12A in which vertical context information is taken into account in accordance with the principles of the present invention.
Figure 12C:
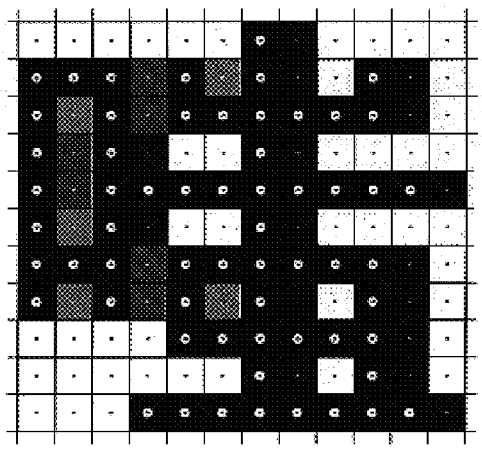
FIG. 12C illustrates the same as FIG. 12B, except with black pixels of the input bitmap being emphasized.
Figure 12D:
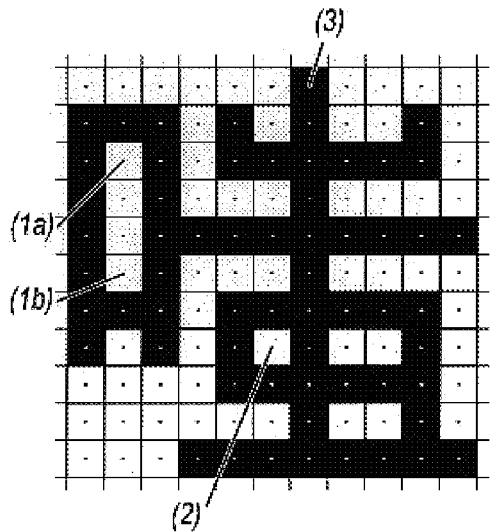
FIG. 12D illustrates the input bitmap of FIG. 12A with several features pointed out.

An example of assigning the gray level values according to this algorithm is shown in FIGS. 12A through 12D. FIG. 12A corresponds to an input bitmap. FIG. 12B shows the result of emboldening using the emboldening algorithm just described. FIG. 12C is the same as FIG. 12B with the only difference that it highlights pixels that were black in the input bitmap. Note a higher level of contrast at the ends of a closed region in FIG. 12C (pixels (1a) and (1b) in the FIG. 12D) and even higher level of contrast for pixel (2) having all black neighbors in the input bitmap. Note also that neither of the white pixels adjacent from the right to the vertical stroke (3) has a black right neighbor, therefore all those pixels are colored black.

A simulated emboldening method that assigns values to subpixels according to a "context" should not be necessarily limited by consideration of a predefined local neighborhood of a pixel only. For example, a simulated emboldening method may take into account the length of a vertical stroke (or, more generally, a stroke perpendicular to the direction of emboldening) in the regular bitmap image, and/or may consider the length of a white region bounded by two strokes from both sides, and the like. Some contextual algorithms that use information related to a wider region of the input bitmap will be described in relation to the fourth general principles referred to herein as <Gen:4> which collectively represent two sub-principles referred to as <Gen:4A> and <Gen:4B>.

In the first sub-principle of the fourth general principle <Gen:4A>, a "path perpendicular to the direction of the emboldening" or "path" is defined as a sequence of pixels generally (but necessarily completely or contiguously) in the direction perpendicular to the direction of emboldening. The second sub-principle <Gen:4B> uses averaging or smoothing in the direction along the "paths".

More precisely, a "path" is a sequence of the pixels that could cause values of other pixel(s) to be modified as a result of emboldening (rather than the pixels whose values are going to be modified). Of course, this definition is introduced for convenience of description only and can be changed without departing from the principles of the present invention.

Figure 13:
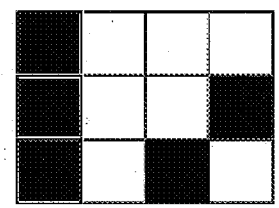
FIG. 13 illustrates an example input Black and White bitmap with a "path" being shown (highlighted) in the left-most column.

For example, for the configuration of pixels in an input bitmap of FIG. 13 (and emboldening in the horizontal direction to the right), the highlighted pixels (the three pixels in the left column of FIG. 13) may represent a "path", although values of the pixels to the right of the "path" are those that are going to be modified.

Algorithms that follow this general concept and principle consist of two steps: 1) computation of initial amount of emboldening and 2) averaging. The first step results in amount of emboldening expressed in a gray-level value computed for the pixels. The computation of the amount of emboldening at the first step can be performed by any appropriate algorithm, including contextual algorithms described in relation to <Gen:2> and <Gen:3> above.

Since the computation of the initial amount of emboldening for a pixel usually relies on a relatively limited neighborhood of the pixel, abrupt undesired sharp variations in the direction perpendicular to the direction of emboldening may be observed. See, for example, the resulting bitmaps of the emboldening methods described in relation to general principles <Gen:2> and <Gen:3> above. In order to smooth those variations and avoid unwanted visual effects caused by emboldening, the second step of averaging is applied. In order to preserve the original design of the character, it is advantageous to maintain approximately even amounts of emboldening applied to each structural element of the input bitmap. Therefore, it would be advantageous for an averaging "path" to generally follow some structural element. However, the interpretation of what constitutes a "structural element" may vary widely. Furthermore, since the rendered results are displayed at very small sizes, some visual blending and visual accomodation of discrete elements is done by our eyes anyway, so that more elaborate algorithms for definition of the "structural elements" may not result in a distinguishable better quality of the rendered result than more simple ones.

Some examples of "paths" are given in FIGS. 14B through 14E, in which the various "paths" are highlighted. In the examples, it is assumed that emboldening is to occur to the right. FIG. 14A represents an input bitmap, whereas FIGS. 14B through 14E represent several highlighted examples of paths that may be derived from various "path" definitions. The examples only show paths that may occur in the second column. In FIG. 14B, a single "path" is defined as all black pixels in the entire column (this "path" might be discontinuous). Accordingly, all of the black pixels in the second column of the bitmap of FIG. 14B are highlighted thereby representing one discontinuous path. In FIG. 14C, a "path" is defined as a continuous vertical sequence of black pixels. Thus, in FIG. 14C, there are two paths in the second column, each path corresponding to each continuous vertical sequence of black pixels. In FIG. 14D, a "path" is defined as a continuous vertical sequence of the black pixels having white right neighbors thereby defining four paths in the second column. In FIG. 14E, a "path" is defined as a continuous vertical sequence of the black pixels so long as the path is not intersected by a continuous horizontal sequence of black pixels (horizontal stroke), the length of the horizontal sequence (horizontal stroke) being at least 3. This results in three different paths in the second column of FIG. 14E.

A "path" should not be necessarily defined as a one-directional sequence of pixels. Any interpretation of a "structural element" of an input bitmap can be used as definition of a "path". For example, taking FIG. 15A as an input bitmap, a "nearly vertical stroke" recognition algorithm can result in two "paths" for an input bitmap as represented by the two highlighted pixel paths in FIG. 15B.

As previously mentioned, the second step of emboldening methods following general principle <Gen: 4B> involve averaging along the path for every path defined by the general principle <Gen: 4A> just described. Such averaging means that all the pixels whose values are going to be modified due to emboldening of a given path will undergo some averaging algorithm. For emboldening in the horizontal direction to the right with an emboldening shift of one pixel, this means that for each "path", an averaging will be applied to all the pixels that were white in the input bitmap and that are immediate right neighbors of the pixels that form the path. For example, for the upper path highlighted in the second column of the input bitmap of FIG. 16, averaging will be applied to all of the "dotted" pixels in the third column.

An averaging itself can be performed according to any averaging algorithm. Examples of such averaging algorithms include uniform averaging or averaging with different weights. The averaging may occur along the whole "path" or only for several neighbors of a pixel. Averaging can take into account discontinuities in the sequence of the pixels being averaged or not, and so on.

Figure 17A:
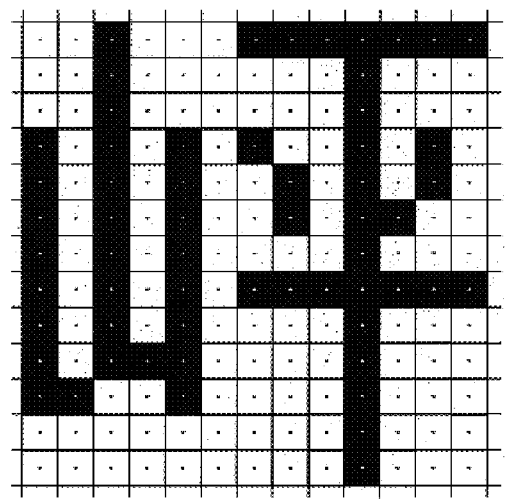
FIG. 17A illustrates an example input Black and White bitmap.
Figure 17B:
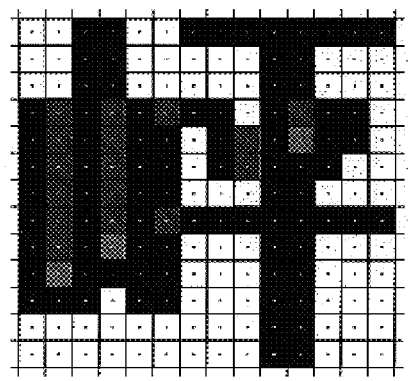
FIG. 17B shows the initial gray level values resulting from the first stage and computed by a simulated emboldening algorithm applied to the input Black and White bitmap of FIG. 17A.
Figure 17C:
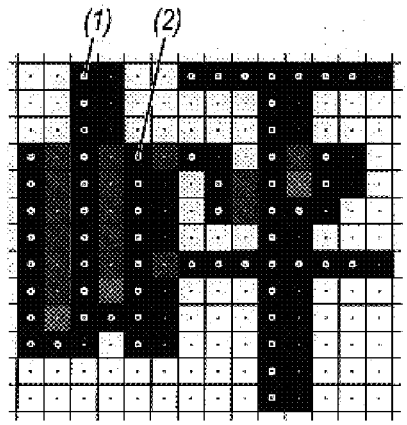
FIG. 17C presents exactly the same result as FIG. 17B, with the input image being highlighted.
Figure 17D:
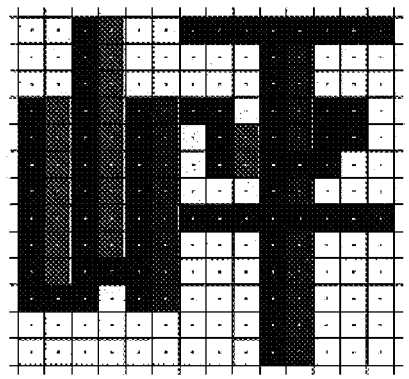
FIG. 17D shows an output bitmap which is the same as that of FIG. 17C, except after the application of a first averaging method.
Figure 17E:
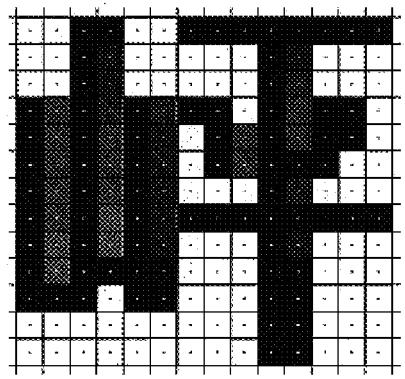
FIG. 17E shows an output bitmap which is the same as that of FIG. 17C, except after the application of a second averaging method.

In example below, FIG. 17A corresponds to an input bitmap. FIG. 17B shows the initial gray level values resulting from the first stage and computed by an algorithm described in relation to <Gen:3>. FIG. 17C presents exactly the same result as FIG. 17B, with the input image being highlighted. Note a "false serif" at the top of the vertical stroke (1), and an uneven appearance of stroke (2) after emboldening. FIGS. 17D and 17E show results of averaging. In both cases, "paths" are defined as any continuous vertical sequence of black pixels. FIG. 17D corresponds to a uniform averaging along the path—note that as the result of the averaging the design of the character is better represented in the emboldened bitmap than when no averaging is used. FIG. 17E corresponds to another averaging approach which computes a gray level value of a pixel based on averaging of the initial gray levels for the pixel and its 2 upper and 2 lower neighbors with different weights—the averaging provides a result which is much smoother overall than one presented in FIG. 17B while maintaining some contrast in the darker areas.

Since the simulated emboldening methods use simple BW bitmap as an input, they are performed in the rasterization process after the simple BW bitmaps become available (see e.g., the (BW to AA: Bitmap Simple Regular to Bitmap Simple Bold) step in FIG. 18) at the end of a standard process of rasterization in BW mode (for regular weight). No (principal) modifications to the other steps of the rasterization process are required. However, depending on the specific implementation of a rasterizer, some minor changes might be required in order to support AA format of the output of the emboldening algorithm. For example, a rasterizer may require more memory allocation in order to be able to return full gray-level values rather than just BW binary bits.

An important difference from the currently applied emboldening in BW mode is that the new algorithms generate output bitmaps in AA rather than in BW format (according to <Gen:1>). Since the emboldening is performed at the last stage of the rasterization process, the output format does not matter for the rasterizer itself. However, a rendering engine should be aware of the AA format of the resulting bitmaps generated by the rasterizer, so that it will interpret the bitmaps correctly and perform mapping of the bitmaps values to the corresponding shades of gray.

A particular parametric family <F1> of algorithms that follows the general concepts and principles <Gen:1>, <Gen:2>, <Gen:3>, <Gen:4> will now be described. Besides making some of the concepts more specific, the algorithmic family describes a particular order of the operations. A possible choice of parameters for this algorithmic family (i.e. a specific algorithm from the family) is now described, and comparison between the new algorithm and the currently commonly applied algorithm is provided.

The parametric family is defined by the following set of parameters and following order of operations.

In the first step referred to as <F1:Step:1>, any kind of pre-processing algorithm is applied to the input bitmap (no pre-processing algorithm being applied is a valid choice). The choice of the pre-processing algorithm is the first parameter <F1:Par:1> that should be defined in order to identify a specific algorithm from the family. For the current family of algorithms, for clarity, we will assume that the pre-processing algorithm (if any) results in a simple BW bitmap.

In the second step referred to as <F1:Step:2>, initial amounts of emboldening are calculated. <F1> uses the following contextual algorithm (see <Gen:3>) that computes the initial amounts of emboldening based on a "4-adjacent neighbors" neighborhood of a pixel. The algorithm is similar to one described in relation to <Gen:3>. Once again, we assume emboldening in the horizontal direction to the right with emboldening shift of 1 pixel. For a pixel whose value should be modified (i.e. for a pixel having a black left neighbor), a "repulsive power" is computed so as to keep visual distance between structural elements of the initial input bitmap. The value of the "repulsive power" will define by how much (in percents or in absolute gray levels) to decrease darkness (i.e., how much to increase brightness) of the embolded pixel with respect to the maximal (i.e., darkest) gray level. The choice of a particular formula for computation of the "repulsive power" represents the second parameter of the parametric family: <F1:Par:2>.

In the third step referred to as <F1:Step:3>, the averaging "paths" are defined, and an averaging algorithm is applied along every averaging "path" (see <Gen:4>). The particular definition of the averaging "path" and particular choice of the averaging algorithm defines respectively third and fourth parameters of the parametric family <F1:Par:3> and <F1:Par:4>. Note that "no averaging" is a valid choice for <F1:Par:4>.

In the fourth step referred to as <F1:Step:4>, for every averaging "path", the resulting average value for all the pixels along the "path" is assigned.

In the fifth step referred to as <F1:Step:5>, any post-processing algorithm is applied to the resulting AA bitmap. It is valid to choose no post-processing algorithm to be applied in <F1:Step:5>. The choice of a particular post-processing algorithm defines the fifth parameter <F1:Par:5> of the parametric family.

An example of a specific algorithm from the algorithmic family <F1> will now be described. Parameters of the particular algorithm described below were chosen after visual comparison of the output results of algorithms from the algorithmic family described above with different parameters applied. One of the goals was to achieve a balance between the quality of the results and the complexity of the algorithm applied. The specific choice of the parameters is described below.

For the first algorithmic parameter <F1:Par:1> (i.e., the preprocessing step), a "cap-correction" algorithm is applied (see description below).

For the second algorithmic parameter <F1:Par:2> (i.e., the definition of a particular formula for "repulsive power"), the definition is as follows: for any pixel whose value should be modified during emboldening, if the pixel has a black neighbor in the direction of emboldening—decrease the assigned maximal gray value by $4/16$ of the maximal gray value, and for every one of the black neighbors in a direction perpendicular to the direction of emboldening, decrease the assigned maximal gray value by additional $3/16$ of the maximal gray value.

For emboldening in the horizontal direction to the right with emboldening shift of 1 pixel, the resulting initial emboldening algorithm may be summarized as follows:

```
If the pixel is white and its left neighbor is black
{
    If its right neighbor is white
    {
        Don't apply repulsive power;
    }
    Else
    {
        Apply repulsive power of 4/16 and
        additional 3/16 if the top neighbor is black and
        additional 3/16 if the bottom neighbor is black
    }
}
```

The resulting assigned value of the above-described example algorithm to an initially white pixel is shown for six different pixel configurations in FIG. 19. The example of FIG. 19 assumes 17 gray levels (0 . . . 16). The result of computation of the initial amount of emboldening by the formula described above is shown in FIGS. 20A and 20B, where FIG. 20A represents an input bitmap, and FIG. 20B corresponds to the result of emboldening before averaging.

For the third algorithmic parameter <F1:Par:3> (i.e., the definition of the averaging "path"), the "path" is defined as a continuous sequence of black pixels in the direction perpendicular to the direction of emboldening.

For the fourth algorithmic parameter <F1:Par:4> (i.e., the definition of the averaging algorithm), uniform averaging of the assigned gray level values is applied to the white pixels along the side of the path in the direction of emboldening.

For emboldening in the horizontal direction to the right with an emboldening shift of 1 pixel, the averaging algorithm may be defined as follows:

Compute the number of the white pixels (in the input bitmap) at the immediate right from the pixels in the "path", let this number be NumWhite.

Compute the total "repulsive power" as the sum of the "repulsive powers" for all white pixels (in the input bitmap) along the "path", let this sum be NegTotal.

Compute an average value LevelMax−(LevelMax*(NegTotal/NumWhite)), where LevelMax is the maximal value of the gray level.

Assign this average value to all the white pixels along the "path".

The result of application of the initial emboldening and this averaging to the original bitmap of FIG. 21A is shown in FIG. 21B (without the pre-processing of "cap-correction" being applied).

The fifth algorithmic parameter <F1:Par:5> (i.e., identification of post-processing) identifies that no post-processing is applied.

The rendering results of the specific algorithm just described above are much more legible than those of the currently commonly applied BW emboldening algorithm for the fonts containing significant number of the complicated, dense characters. For instance, FIG. 22A shows an input bitmap. The result of the emboldening according to a current commonly applied BW emboldening algorithm is shown in FIG. 22B. In stark contrast, the result of the emboldening according to the specific example <F1> algorithm is shown in FIG. 22C. Clearly, the bolded character of FIG. 22C is a much more recognizable embolded image of the character in FIG. 22A than FIG. 22B is.

The pre-processing step of "cap-correction" will now be described. The reason for the "cap-correction" algorithm is to eliminate narrow "caps" in the joints between inclined strokes, which otherwise will cause visual discontinuity of the connected strokes after emboldening. The following description and examples illustrate "cap correction" for horizontal emboldening by one pixel to the right. The same basic algorithmic approach to "cap detection" and "cap correction" can be applied to other directions for emboldening. For example, suppose the input bitmap of FIG. 23A is to be emboldened one pixel to the right. The example bitmap emboldening algorithm (from family <F1>) without "cap-correction" applied to the regular image of FIG. 23A will result in the emboldened bitmap of FIG. 23B. The bitmap of FIG. 23B appears to consist of two separate strokes (longer on the right and shorter on the left), while the strokes were connected in the regular bitmap. The emboldened bitmap image of FIG. 23B (with this visual discontinuity) could be mis-intrepreted (mis-read) as an entirely different (semantically different) character than the one represented in the regular weight bitmap of FIG. 23A. The "cap-correction" algorithm identifies narrow joints between inclined connected strokes, and prevents visual discontinuity in the emboldened image. The new emboldening algorithm applied with "cap-correction" will result in the bitmap of FIG. 23C.

Figure 24A:
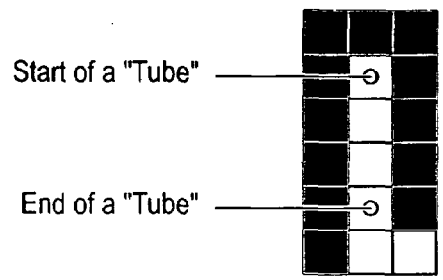
FIG. 24 is an example input Black and White bitmap segment having a "tube" and with the endpoint of the tube being identified.
Figure 25:
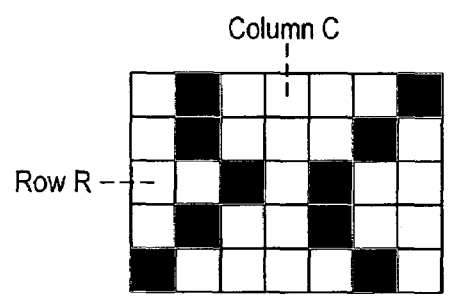
FIG. 25 is an example input Black and White bitmap having a tube triplet.

In order to describe the "cap-correction" algorithm we will use several definitions. A "tube" is a continuous one column wide vertical sequence of white pixels in the input bitmap bounded on both left and right sides by black pixels. The tube shown in the pixel configuration of FIG. 24 shows a tube that is closed at the top by a black pixel and is open at the bottom. A row R for a given column C corresponds to a "tube triplet" if the pixel in row R and column C is white and both its left and right neighbors are black. An example of a row corresponding to a "tube triplet" is shown in FIG. 25.

Figure 26:
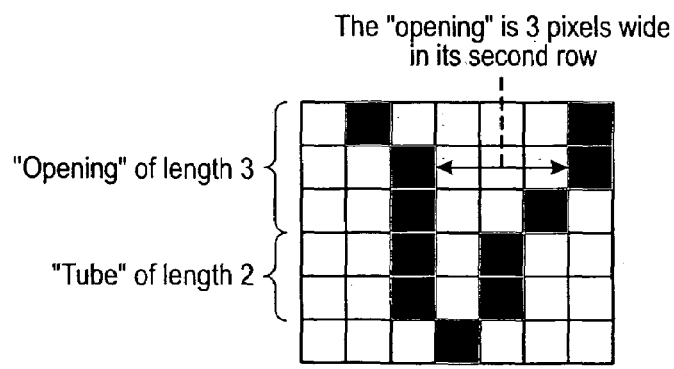
FIG. 26 is an example input Black and White bitmap having an "opening", with portions of the opening being identified.

Furthermore, an "opening" will now be defined. There are two chains of black pixels (left and right) that run along the left and right sides, respectively, of a tube. The black pixels of the left chain extend from one end of the tube and continue vertically so long as there is another black pixel that it connects to vertically (or diagonally to the left). The black pixels of the right chain extend from one end of the tube and continue vertically in the same direction as the left tube so long as there is another black pixel that it connects to vertically (or diagonally to the right). An "opening" is that area outside of the tube that is still bounded by the left and right chains. An opening is said to be of (at least) length L if both left and right chains contain at least L pixels counting from the open end of the tube. The width of an opening at a specific row is the number of white pixels between the right and left chains of that specific row. An example of an opening is shown in FIG. 26. In that example, the opening has a length 3, which extends from the opening of a tube of length 2. The opening has a width of 2 at the third row from the top, a width of 3 at the second row from the top, and a width of 4 at the first (top) row.

Figure 27:
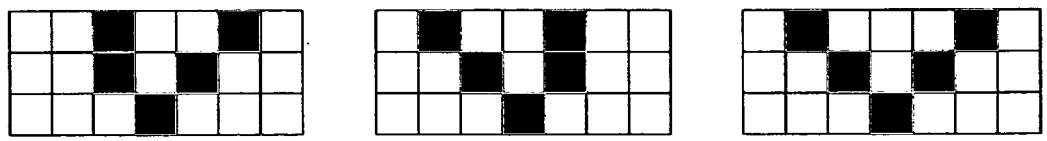
FIG. 27 shows all possible caps opened to the top with tubes of length 1 in accordance with a definition of the term caps.
Figure 28:
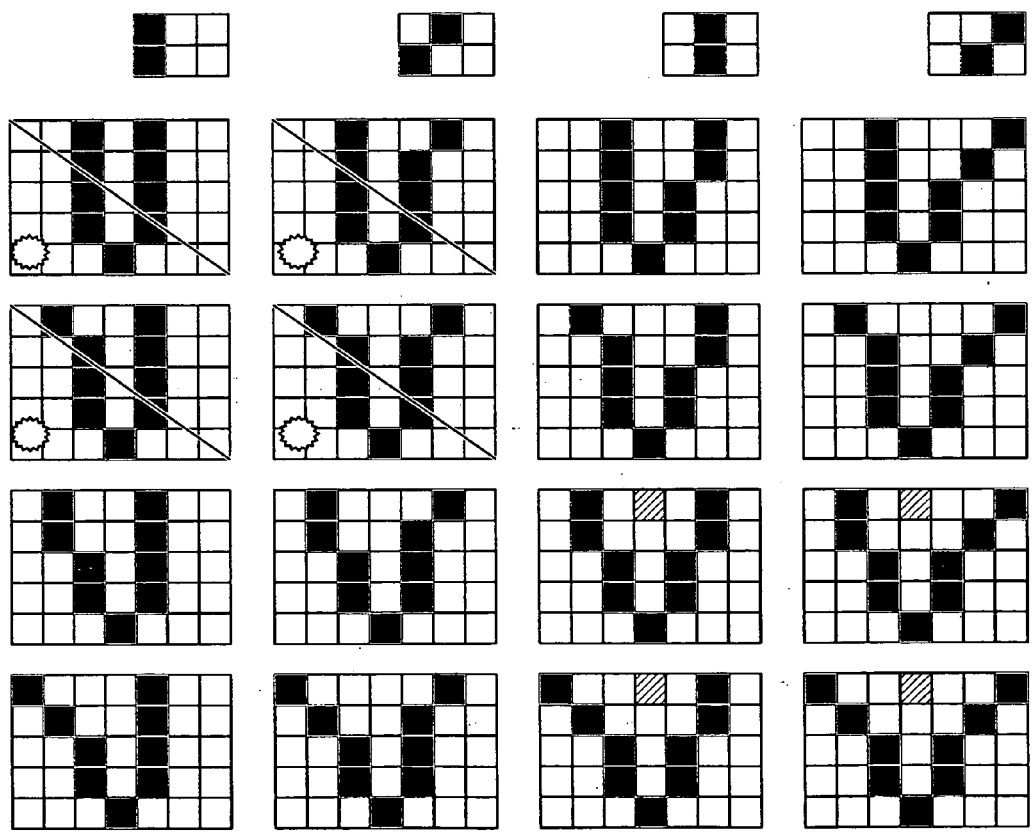
FIG. 28 shows all possible caps opening to the top with a tube of length 2 in accordance with the definition of the term caps.

A "cap" is a "tube" followed by an "opening". The cap-correction algorithm will detect caps if the following criteria are satisfied. First, there is found a tube of length 1 or 2 that is closed at one vertical end. An opening at the other end of the tube is found, the opening being at least 2 pixels wide in its first row counting from the open end of the tube. No black pixels are found inside of the opening touching (even diagonally) the black pixels defining the tube or the opening. FIG. 27 shows all possible "caps" opened to the top with tubes of length 1. FIG. 28 shows all possible caps opened to the top with tubes of length 2.

The "cap-correction" algorithm operates as follows.
1) In the original regular bitmap, detect all "caps" (corresponding with the direction of emboldening)
2) For every "cap", fill in its "tube" with a predefined dark shade of gray (black in the present implementation).

Accordingly, the simulated emboldening methods just described provide improved methods for generating an emboldened bitmap of an original BW bitmap. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. A computer-implemented method for performing simulated emboldening of the characters of a font when rendering the characters, the method comprising the following acts:
   determining whether a font contains embedded Black and White bitmaps for one or more characters of the font, and if so,
      inputting data from the bitmaps for the one or more characters of the font,
      and if not, inputting outline data for one or more characters of the font;
   irrespective of whether the input data is from an embedded bitmap or from outline data, generating from the input data a Black and White bitmap for the characters of the font;
   accessing the Black and White bitmap;

using the Black and White bitmap to generate an emboldened Anti-Aliasing bitmap and consequently extending the number of possible shading choices for a pixel by not requiring that it be limited to simply two binary values per pixel; and mapping values of the Anti-Aliasing bitmap to the pixels of a display for one or more characters of the font.

2. The computer-implemented method in accordance with claim 1, wherein the act of using the input Black and White bitmap to generate an emboldened Anti-Aliasing bitmap comprises the following for at least one of the output pixels whose corresponding input pixel is white:

an act of determining that the left neighbor input pixel for the corresponding input pixel is black;

an act of determining that the right neighbor input pixel for the corresponding input pixel is black; and an act of assigning a middle gray level to the output pixel in response to the acts of determining.

3. The computer-implemented method in accordance with claim 2, wherein the middle gray level is assigned by performing the following:

an act of determining whether the upper neighboring input pixel for the corresponding input pixel is white or black; and if the upper neighboring input pixel for the corresponding input pixel is determined to be black, an act of assigning a lighter middle gray level than would be assigned had the upper neighboring input pixel been determined to be white.

4. The computer-implemented method in accordance with claim 3, wherein the middle gray level is assigned by performing the following:

an act of determining whether the lower neighboring input pixel for the corresponding input pixel is white or black; and if the lower neighboring input pixel for the corresponding input pixel is determined to be black, an act of assigning a lighter middle gray level than would be assigned had the lower neighboring input pixel been determined to be white.

5. The computer-implemented method in accordance with claim 2, wherein the middle gray level is assigned by further performing the following:

an act of determining whether the lower neighboring input pixel for the corresponding input pixel is white or black; and if the lower neighboring input pixel for the corresponding input pixel is determined to be black, an act of assigning a lighter middle gray level than would be assigned had the lower neighboring input pixel been determined to be white.

6. A computer-implemented method in accordance with claim 5, wherein the act of using the Black and White bitmap to generate an emboldened Anti-Aliasing bitmap further comprises the following:

an act of identifying a path of a sequence of pixels generally in a direction perpendicular to a direction of the emboldening that causes values of other pixels including the output pixels to be emboldened due to the implementation of the acts of applying a middle gray level to the corresponding output pixels; and an act of applying averaging of the middle gray levels assigned to the corresponding output pixels to generate a final middle gray level to the corresponding output pixels.

7. A computer-implemented method in accordance with claim 4, wherein the act of using the Black and White bitmap to generate an emboldened Anti-Aliasing bitmap further comprises the following:

an act of identifying a path of a sequence of pixels generally in a direction perpendicular to a direction of the emboldening that causes values of other pixels including the output pixels to be emboldened due to the implementation of the acts of applying a middle gray level to the corresponding output pixels; and an act of applying averaging of the middle gray levels assigned to the corresponding output pixels to generate a final middle gray level to the corresponding output pixels.

8. A computer-implemented method in accordance with claim 3, wherein the act of using the Black and White bitmap to generate an emboldened Anti-Aliasing bitmap further comprises the following:

an act of identifying a path of a sequence of pixels generally in a direction perpendicular to a direction of the emboldening that causes values of other pixels including the output pixels to be emboldened due to the implementation of the acts of applying a middle gray level to the corresponding output pixels; and an act of applying averaging of the middle gray levels assigned to the corresponding output pixels to generate a final middle gray level to the corresponding output pixels.

9. A computer-implemented method in accordance with claim 2, wherein the act of using the Black and White bitmap to generate an emboldened Anti-Aliasing bitmap further comprises the following:

an act of identifying a path of a sequence of pixels generally in a direction perpendicular to a direction of the emboldening that causes values of other pixels including the output pixels to be emboldened due to the implementation of the acts of applying a middle gray level to the corresponding output pixels; and an act of applying averaging of the middle gray levels assigned to the corresponding output pixels to generate a final middle gray level to the corresponding output pixels.

10. A computer-implemented method in accordance with claim 1, further comprising the following:

an act of displaying the one or more characters of the mapped and emboldened Anti-Aliasing bitmap on a display.

11. A computer-implemented method in accordance with claim 1, wherein the act of using the input Black and White bitmap to generate an emboldened Anti-Aliasing bitmap comprises:

an act of determining the presence of at least one narrow cap corresponding with the direction of emboldening in the joints between inclined strokes in the input bitmap; and an act of assigning a black value to the input pixels that make up the tube of each of the at least one narrow cap.

12. A computer program product comprising one or more computer-readable media having thereon computer-executable instructions that, when executed by one or more processors of a computing system, cause the computing system to perform a method for performing simulated emboldening of the characters of a font when rendering the characters, the method comprising the following acts:

determining whether a font contains embedded Black and White bitmaps for one or more characters of the font, and if so, inputting data from the bitmaps for the one or more characters of the font, and if not, inputting outline data for one or more characters of the font;

irrespective of whether the input data is from an embedded bitmap or from outline data, generating from the input data a Black and White bitmap for the characters of the font;

accessing the Black and White bitmap;

using the Black and White bitmap to generate an emboldened Anti-Aliasing bitmap and consequently extending the number of possible shading choices for a pixel by not requiring that it be limited to simply two binary values per pixel; and mapping values of the Anti-Aliasing bitmap to the pixels of a display for one or more characters of the font.

13. The computer program product in accordance with claim 12, wherein the act of using the input Black and White bitmap to generate an emboldened Anti-Aliasing bitmap comprises the following for at least one of the output pixels whose corresponding input pixel is white:

an act of determining that the left neighbor input pixel for the corresponding input pixel is black;

an act of determining that the right neighbor input pixel for the corresponding input pixel is black; and an act of assigning a middle gray level to the output pixel in response to the acts of determining.

14. The computer program product in accordance with claim 13, wherein the middle gray level is assigned by performing the following:

an act of determining whether the upper neighboring input pixel for the corresponding input pixel is white or black; and if the upper neighboring input pixel for the corresponding input pixel is determined to be black, an act of assigning a lighter middle gray level than would be assigned had the upper neighboring input pixel been determined to be white.

15. The computer program product in accordance with claim 14, wherein the middle gray level is assigned by performing the following:

an act of determining whether the lower neighboring input pixel for the corresponding input pixel is white or black; and if the lower neighboring input pixel for the corresponding input pixel is determined to be black, an act of assigning a lighter middle gray level than would be assigned had the lower neighboring input pixel been determined to be white.

16. The computer program product in accordance with claim 15, wherein the act of using the Black and White bitmap to generate an emboldened Anti-Aliasing bitmap further comprises the following:

an act of identifying a path of a sequence of pixels generally in a direction perpendicular to a direction of the emboldening that causes values of other pixels including the output pixels to be emboldened due to the implementation of the acts of applying a middle gray level to the corresponding output pixels; and an act of applying averaging of the middle gray levels assigned to the corresponding output pixels to generate a final middle gray level to the corresponding output pixels.

17. A computer program product in accordance with claim 14, wherein the act of using the Black and White bitmap to generate an emboldened Anti-Aliasing bitmap further comprises the following:

an act of identifying a path of a sequence of pixels generally in a direction perpendicular to a direction of the emboldening that causes values of other pixels including the output pixels to be emboldened due to the implementation of the acts of applying a middle gray level to the corresponding output pixels; and an act of applying averaging of the middle gray levels assigned to the corresponding output pixels to generate a final middle gray level to the corresponding output pixels.

18. A computer program product in accordance with claim 13, wherein the act of using the Black and White bitmap to generate an emboldened Anti-Aliasing bitmap further comprises the following:

an act of identifying a path of a sequence of pixels generally in a direction perpendicular to a direction of the emboldening that causes values of other pixels including the output pixels to be emboldened due to the implementation of the acts of applying a middle gray level to the corresponding output pixels; and an act of applying averaging of the middle gray levels assigned to the corresponding output pixels to generate a final middle gray level to the corresponding output pixels.

19. A computer program product in accordance with claim 12, wherein the method further comprises the following:

an act of displaying the one or more characters of the mapped and emboldened Anti-Aliasing bitmap on a display.

20. A computer program product in accordance with claim 12, wherein the act of using the input Black and White bitmap to generate an emboldened Anti-Aliasing bitmap comprises:

an act of determining the presence of at least one narrow cap corresponding with the direction of emboldening in the joints between inclined strokes in the input bitmap; and an act of assigning a black value to the input pixels that make up the tube of each of the at least one narrow cap.

21. A computer-implemented method for performing simulated emboldening of the characters of a font when rendering the characters, the method comprising the following acts:

determining whether a font contains embedded Black and White bitmaps for one or more characters of the font, and if so, inputting data from the bitmaps for the one or more characters of the font, and if not, inputting outline data for one or more characters of the font;

irrespective of whether the input data is from an embedded bitmap or from outline data, generating from the input data a Black and White bitmap for the characters of the font;

accessing the Black and White bitmap;

using the Black and White bitmap to generate an emboldened Anti-Aliasing bitmap by performing the following further acts for at least one output pixel of the Anti-Aliasing bitmap for which a corresponding input pixel from the Black and White bitmap is white:

determining that the left neighbor input pixel for the corresponding input pixel is black;

determining that the right neighbor input pixel for the corresponding input pixel is black; and assigning a middle gray level to the output pixel in response to the acts of determining; and mapping values of the Anti-Aliasing bitmap to the pixels of a display for one or more characters of the font.

22. A computer program product comprising one or more computer-readable media having thereon computer-executable instructions that, when executed by one or more processors of a computing system, cause the computing system to perform a method for performing simulated emboldening of the characters of a font when rendering the characters, the method comprising the following acts:

determining whether a font contains embedded Black and White bitmaps for one or more characters of the font, and if so, inputting data from the bitmaps for the one or more characters of the font, and if not, inputting outline data for one or more characters of the font;

irrespective of whether the input data is from an embedded bitmap or from outline data, generating from the input data a Black and White bitmap for the characters of the font;

accessing the Black and White bitmap;

using the Black and White bitmap to generate an emboldened Anti-Aliasing bitmap by performing the following further acts for at least one output pixel of the Anti-Aliasing bitmap for which a corresponding input pixel from the Black and White bitmap is white:

determining that the left neighbor input pixel for the corresponding input pixel is black;

determining that the right neighbor input pixel for the corresponding input pixel is black; and assigning a middle gray level to the output pixel in response to the acts of determining; and mapping values of the Anti-Aliasing bitmap to the pixels of a display for one or more characters of the font.

* * * * *